(12) United States Patent
Gleich et al.

(10) Patent No.: US 12,535,545 B2
(45) Date of Patent: Jan. 27, 2026

(54) MECHANICAL GRADIENT MAGNETIC FIELD GENERATOR

(71) Applicant: KONINKLIJKE PHILIPS N.V., Eindhoven (NL)

(72) Inventors: Bernhard Gleich, Hamburg (DE); George Randall Duensing, Hamburg (DE); Johannes Adrianus Overweg, Uelzen (DE); Peter Ulrich Börnert, Hamburg (DE); Jochen Keupp, Rosengarten (DE)

(73) Assignee: Koninklijke Philips N.V., Eindhoven (NL)

( * ) Notice: Subject to any disclaimer, the term of this patent is extended or adjusted under 35 U.S.C. 154(b) by 148 days.

(21) Appl. No.: 18/690,775

(22) PCT Filed: Sep. 7, 2022

(86) PCT No.: PCT/EP2022/074808
§ 371 (c)(1),
(2) Date: Mar. 11, 2024

(87) PCT Pub. No.: WO2023/036799
PCT Pub. Date: Mar. 16, 2023

(65) Prior Publication Data
US 2025/0138117 A1 May 1, 2025

(30) Foreign Application Priority Data
Sep. 13, 2021 (EP) .................................... 21196248

(51) Int. Cl.
*G01R 33/383* (2006.01)
*G01R 33/3815* (2006.01)
(Continued)

(52) U.S. Cl.
CPC ....... *G01R 33/383* (2013.01); *G01R 33/3815* (2013.01); *H01F 7/0226* (2013.01); *G01R 33/385* (2013.01)

(58) Field of Classification Search
CPC .............. G01R 33/385; G01R 33/3815; G01R 33/383; H01F 7/0284; H01F 7/0226
See application file for complete search history.

(56) References Cited

U.S. PATENT DOCUMENTS 6,535,092 B1 * 3/2003 Hurley ............... H01F 7/0278
335/298
6,537,196 B1 * 3/2003 Creighton, IV ....... A61B 34/73
600/12

(Continued)

FOREIGN PATENT DOCUMENTS

WO 2020096855 A1 5/2020

OTHER PUBLICATIONS

International Search Report and Written Opinion from PCT/EP2022/074808 mailed Nov. 30, 2022.

*Primary Examiner* — Daniel R Miller

(57) ABSTRACT

Disclosed herein is a mechanical gradient magnetic field generator (100, 500, 1600, 1700, 2000, 2112) comprising a field generating element (102) comprising at least one generator layer (104). Each of the at least one generator layer comprises: a stationary divider (106); a movable divider (108) configured for moving in one (110) or two (1602) displacement directions; a mechanical element (112) configured to mechanically assist movement of the movable divider in the one or two displacement directions towards an initial position (508); and a set of rotatable magnets (114) positioned between the movable divider and the stationary divider. The set of rotatable magnets are mechanically coupled to the movable divider and to the stationary divider. The mechanical coupling of the set of rotatable magnets is (Continued)

such that movement of the movable divider in the one or two displacement directions causes an individual rotation of each of the set of rotatable magnets.

16 Claims, 20 Drawing Sheets

(51) Int. Cl.
*H01F 7/02* (2006.01)
*G01R 33/385* (2006.01)

(56) References Cited

U.S. PATENT DOCUMENTS

| | | | |
|---|---|---|---|
| 8,570,042 B2 * | 10/2013 | Pines | G01R 33/3808 |
| | | | 324/309 |
| 9,774,221 B1 | 9/2017 | Holland et al. | |
| 2004/0196127 A1 * | 10/2004 | Perrin | H01J 37/3455 |
| | | | 335/299 |
| 2008/0054902 A1 | 3/2008 | Juchem | |
| 2009/0128272 A1 | 5/2009 | Hills | |
| 2010/0219918 A1 * | 9/2010 | Higuchi | H01F 7/0284 |
| | | | 335/219 |
| 2015/0177343 A1 | 6/2015 | Wald et al. | |
| 2020/0096855 A1 | 3/2020 | Shibuya | |

* cited by examiner

MECHANICAL GRADIENT MAGNETIC FIELD GENERATOR

CROSS REFERENCE TO RELATED APPLICATIONS

This application is a U.S. national phase application of International Application No. PCT/EP2022/074808 filed on Sep. 7, 2022, which claims the benefit of EP Application Serial No. 21196248.5 filed on Sep. 13, 2021 and is incorporated herein by reference.

FIELD OF THE INVENTION

The invention relates to magnetic resonance imaging, in particular to the generation of gradient magnetic fields.

BACKGROUND OF THE INVENTION

A large static magnetic field is used by Magnetic Resonance Imaging (MRI) scanners to align the nuclear spins of atoms as part of the procedure for producing images within the body of a patient. This large static magnetic field is referred to as the $B_0$ field or the main magnetic field. Various quantities or properties of the subject can be measured spatially using MRI. Spatial encoding in magnetic resonance imaging is performed using a combination of a radio frequency (RF) waveform (or RF pulse) that is used to control the transmit coil of the MRI scanner and multiple spatially selective gradient pulse waveforms (gradient pulses) that are driving corresponding gradient coil configurations to superimpose desired spatial encoding fields on top of the $B_0$ field.

United States patent application US2008/054902A1 discloses a method of providing shim sheets for adjusting a magnetic field in a magnetic resonance device by passive shimming, comprises the steps of field mapping of a region of interest in the MR device for obtaining an uncorrected magnetic field distribution including field inhomogeneities, decomposing the field inhomogeneities into first and second order spherical harmonic functions, determining primary shim terms derived from the second order spherical harmonic functions, wherein the primary shim terms yield a passive shim field adapted to a targeted shim field, scaling optimized shim terms for increasing a similarity of the passive shim field with the targeted shim field, constructing modular shim sheets on the basis of the optimized shim terms, and mounting the modular shim sheets on a shim sheet carrier of the magnetic resonance device.

The international application WO2020/096855 discloses an apparatus for creation of a magnetic field, e.g. to propel a magnetic device (bot) through biological tissue. This known apparatus comprises a Halbach array of a plurality of rod shaped magnets arranged as interleaved arrays of rod magnets.

SUMMARY OF THE INVENTION

The invention provides for a mechanical gradient magnetic field generator, a magnetic resonance imaging system, and a magnetic resonance imaging coil in the independent claims. Embodiments are given in the dependent claims.

Usually, a gradient system is a major cost factor in manufacturing a magnetic resonance imaging system. Power supplies which are able to supply large and changing amounts of electrical current for short durations are often required. Alternative examples may provide for a means of eliminating or reducing the need for gradient coils and their associated power supplies by providing a mechanical gradient magnetic field generator. A set of rotatable magnets that are individually rotatable may be used to generate a gradient magnetic field suitable for magnetic resonance imaging.

Rotation of the set of rotatable magnets may be used to turn on and off or to adjust the gradient magnetic field. Each of the rotatable magnets is for example rotatable about an axis through body of the rotatable magnet, in particular the axis of rotation of the individual rotatable magnet passes through its geometrical centre. The set of rotatable magnets is held or constrained by a stationary divider and a movable divider. The set of rotatable magnets are mechanically coupled to the stationary divider and the movable divider such that when the movable divider is moved on one or two displacement directions the magnets of the set of rotatable magnets are individually rotated. Actuation of the movable divider thereby enables control of the gradient magnetic field generated by the mechanical gradient magnetic field generator. The amount of mechanical energy necessary to actuate the movable divider may be reduced by using a mechanical element that is configured to mechanically assist the movable divider to return to an initial position.

In one aspect the invention provides for a mechanical gradient magnetic field generator that comprises a field generating element that comprises at least one generator layer. Each of the at least one generator layer comprises a stationary divider. Each of the at least one generator layer comprises a moveable divider that is configured for moving in one or two displacement directions relative to the stationary divider. The moveable divider has an initial position.

The term stationary divider and moveable divider as used herein may also refer to a wall or structure. The stationary divider and the moveable divider may also be rigid.

Each of the at least one generator layer further comprises a mechanical element configured to mechanically assist movement in the one or two displacement directions towards the initial position. The mechanical element may take different embodiments in different forms. For example, a spring or other elastic element may be configured such that when the moveable divider is moved in the one or two displacement directions there is a restoring force which assists in restoring the moveable divider back to the initial position. The restoring force exerted onto the moveable divider may be generated by the mechanical element's resilience. The use of the mechanical element may be beneficial because it may reduce the amount of energy needed to operate the mechanical gradient magnetic field generator.

Each of the at least one generator layer further comprises a set of rotatable magnets positioned between the moveable divider and the stationary divider. The moveable divider and the stationary divider may for example restrict the motion of the set of rotatable magnets. The set of rotatable magnets are mechanically coupled to the moveable divider and to the stationary divider. The mechanical coupling of the set of rotatable magnets is such that movement of the moveable divider in the one or two displacement directions causes an individual rotation of each of the set of rotatable magnets. The rotation of the set of rotatable magnets individually may enable the generation of a gradient magnetic field that is useful for magnetic resonance imaging or other MR applications such as MR spectroscopy or diffusion encoding without spatial resolution.

The use of a mechanical element can be used to offset the amount of energy necessary to cause the individual rotation of the set of rotatable magnets. This for example may enable operation of the gradient magnetic field generator in a main magnetic field of a magnetic resonance imaging system with a reduced amount of energy used. This may for example have benefits over conventional gradient coils in a magnetic resonance imaging system in that less energy is necessary to produce the gradient magnetic field for magnetic resonance imaging.

The underlying physics relating the generation of gradient magnetic fields according to the invention is explained in the following.

The invention concerns to improve the generation of magnetic gradient fields that are employed in magnetic resonance imaging for spatial encoding of magnetic resonance signal and for selection of spatial regions (slices or volumes) in which spins are manipulated (refocuses, inverted, dephases). The gradient magnetic fields are activated by electrical current waveforms.

The present invention provides for a meta-material of rotatable magnetic elements (spheres) of which a large angular deflection goes with short travel paths of the rotation along the surface of the sphere. Accordingly only a low amount of kinetic energy is involved in rotation over a high angular deflection (e.g. $\pi$, or $\pi/2$). The rotatable elements are driven by the moveable divider that is displaced by an actuator ((electro, thermal)-mechanical actuator piezo-electrical element, electromagnetic coil). The rotatable magnetic elements may be rotated individually about a rotational axis. Rotation about the rotational axis cause a change of the direction of the magnetic field generated by the magnetic elements. The rotatable magnetic elements may each be rotated about their individual axes of rotation passing through the magnetic elements or the magnetic elements may be rotated about a common external axis of rotation, or about individual external axes of rotation.

Further, a mechanical element (e.g. a spring, or elastic material) is provided to exert a balancing offset force to compensate the force by the magnetic field to re-orient the rotated magnetic spheres in the main magnetic field of the magnetic resonance examination system. This leads to a low energy difference of the combination of the meta-material (layer(s) of spheres) and the actuator for different rotation states of the spheres. It keeps the meta-material in the right position in the applied magnetic fields while still allowing it to be rotated by the actuator (gradient coil). So the spring balances (mainly) the inherent spring action of the main magnetic field ($B_0$). The spring may be some mechanical spring (some elasticity in the construction, not necessarily a coil) but it may also be some similar meta material positioned in a way not to produce magnetic field in the field of view, but provide only "counter springiness" to the rest of the meta-material.

The mechanical gradient magnetic field generator of the invention may replace the conventional electrically driven gradient coils. The rotating magnetic spheres generate the magnetic gradient fields and by way of rotating the magnetic spheres. The rotation may be driven on the basis of electrical gradient waveforms. One or several mechanical gradient magnetic field generators may be position adjacent to the examination zone of the magnetic resonance examination system.

An alternative technical effect of the meta-material and the actuator (forming the mechanical magnetic field generator) is to enhance the magnetic gradient field produced by the (conventional) gradient coil, so that a relatively weak electrical current may be applied to the gradient coil. To that end, the mechanical magnetic field generator may be placed between the inner and outer coil of a conventional shielded gradient coil; or the mechanical gradient magnetic field generator may be placed radially outside of the unshielded gradient coil. Due to the enhanced magnetic flux conveyed by the meta-material formed by the layers of magnetic spheres, the magnetic gradient field strengths in enhanced relative to the gradient fields produced by the gradient coil itself.

That is, the meta-material has an extremely high magnetic susceptibility, while with the actuator operation easy and rapid re-orientations of the magnetic dipole is possible. This implementation of the mechanical gradient magnetic field generator as an insert gradient enhancer enables efficient conveyance and changing of magnetic flux to enhance the gradient magnetic field strength given the applied electrical current. In this implementation the rotation of the magnetic spheres is driven by the gradient magnetic field of the gradient coil, i.e. controlled by the actual gradient waveform, and the force on the divider is balanced by the spring action. In addition, the mechanic gradient magnetic field generator is comparatively easy to manufacture because the size of the spheres is small but clearly macroscopic, so that the magnetic spheres are easy to handle and inexpensive. Further the components of the spring part, dividers and the magnetic spheres from simple mechanical arrangement.

In practice the mechanical gradient magnetic field generator may generate a gradient amplitude in the range of 40 $mTm^{-1}$ to 200 $mTm^{-1}$ and a typical slew rate for gradient switching of about 200 $Tm^{-1}s^{-1}$ Various types of magnets may be used. For example, the magnets may be neodymium iron boron magnets, samarium cobalt magnets, or iron platinum magnets will all function well.

The stationary divider and the moveable divider may be rigid to restrict the motion of the set of rotatable magnets. The use of the rigid dividers may be beneficial because it may provide for a more reproducible gradient magnetic field.

The generator layers may be constructed in different ways. In some examples the generator layer just has a single set of rotatable magnets. In this case, the gradient magnetic field can be controlled by rotating the set of rotatable magnets such that the gradient magnetic field in the field of view is aligned with the main magnetic field (or is perpendicular to it). For example, when the gradient magnetic field is perpendicular to the main magnetic field it will have a negligible effect on the magnitude of the overall magnetic field. If the gradient magnetic field is aligned with the main magnetic field then there may be a large enough gradient in the magnitude of the magnetic field to perform spatially resolved magnetic resonance imaging.

In another embodiment the set of rotatable magnets each has a magnetic pole that is preferably perpendicular to the rotation of the set of rotatable magnets about one of the one or two displacement directions. This may be beneficial because it may maximize the size of the gradient magnetic field that the mechanical gradient magnetic field generator is able to produce.

In another embodiment the mechanical element is an elastic element or spring. This may be used for example to counteract the force of the main magnetic field on the set of rotatable magnets. In other embodiments the mechanical elements are additional magnets with their poles aligned with the field lines in the initial position and placed away from the set of rotatable magnets, for example placed in a position so that they will not affect the gradient magnetic field greatly. This embodiment may be beneficial because it may eliminate the need for additional mechanical components such as springs.

In another embodiment the field generating element further comprises an elastic layer attached to the stationary divider and the moveable divider. The set of rotatable magnets is embedded within the elastic layer. The elastic layer provides for the mechanical coupling of the set of rotatable magnets. Deformation of the elastic material by the movement of the moveable divider causes individual rotation of each of the set of rotatable magnets. This embodiment may be beneficial because it may provide for an effective means of controlling not only the initial orientation of the set of rotatable magnets but also enabling them to be rotated in the one or two displacement directions. For example, the moveable divider and the stationary divider can be provided and then an elastomer can then be seated with the set of rotatable magnets in the desired orientation. Once a curing process is finished the moveable divider can be moved in a variety of different directions which will cause a rotation of the set of rotatable magnets individually.

A further benefit of this embodiment is that the elastic layer may serve as the mechanical element to assist in returning the moveable divider to the initial position.

In another embodiment the mechanical coupling is provided by gear teeth on the set of rotatable magnets. For example, there may be matching gear teeth on the surface of the stationary divider and/or the moveable divider. The gear teeth may provide for an extremely effective means of controlling the orientation and rotation of the set of rotatable magnets.

In another embodiment the mechanical coupling is provided by a high friction layer on the moveable divider and/or on the set of rotatable magnets. For example, a high friction elastomer layer such as a rubber or else an additional such as a contact adhesive which is sticky may also be useful.

In another embodiment the mechanical coupling is provided by a viscous layer on the moveable divider and/or the set of rotatable magnets. This may be beneficial because it may prevent unwanted rotation of the set of rotatable magnets.

In another embodiment the mechanical coupling is provided via an elastic or friction enhancing layer on the moveable divider and/or on the set of rotatable magnets. For example, a rubber layer may be used to provide enough friction to control the rotation of the set of rotatable magnets effectively.

In another embodiment the mechanical coupling is provided by contact between the set of rotatable magnets and the moveable divider. For example, there may be additional structures such as cups or fixtures which are used to fix the position between the set of rotatable magnets and the stationary divider and/or the moveable divider.

In another embodiment each of the set of rotatable magnets is spherically-shaped. Having the magnets spherically-shaped may for example enable movement in two different directions. In some examples the rotatable magnets are spherically-shaped but they may be placed within an additional holder. For example, the spherically-shaped magnet may be placed in a cylindrical holder with gears on it. A technical benefit of having spherically-shaped magnets is that this enables the largest volume of a magnet below a certain size. For example, when the magnetic field generator is taken from outside of a magnetic resonance imaging magnet to inside of it there are extremely high gradient fields at the entry, for example in the entry to the bore of a cylindrical magnet. Limiting the overall dimension of the magnet, for example having a diameter force sphere enables the choice of magnets which will limit the force of these magnetic field gradients on the magnet.

In another embodiment each of the set of rotatable magnets is cylindrically-shaped. This embodiment may be beneficial because it provides for a high degree of mechanical stability, particularly when the motion direction is a single motion direction.

In another embodiment each of the set of rotatable magnets is rotationally symmetric about a rotational axis. For example, there may be gears or spokes located or formed in the magnet itself. This may provide for magnets that have a high degree of rotational stability with respect to the stationary divider and the moveable divider.

In another embodiment the mechanical gradient field generator has a planar shape. In this example the stationary dividers and moveable dividers could for example be formed from plates. This would be a very mechanically stable and easy to mount form for the mechanical gradient magnetic field generator.

In another embodiment the mechanical gradient magnetic field generator has a cylindrical shape. This for example may be formed by making the moveable divider and the stationary divider out of concentric tubes. This may for example provide a very efficient means of creating a gradient magnetic field in a volume. Another advantage is that with the cylindrical shape, the moveable divider could for example be moved along the direction of the rotational axis as well as being rotated about it. This may provide for one or two displacement directions.

In another embodiment the mechanical gradient magnetic field generator is a polygonal tube. The mechanical gradient magnetic field generator comprises multiple of the field generating element. The polygonal tube is formed from the multiple of the field generating element. In this embodiment for example, the field generating elements could be formed in planar or rectangular shape. These could then be combined using multiple units to make a polygonal tube. This may be particularly efficient at controlling the gradient field. For example, each of the multiple of the field generating elements could be controlled independently. This may provide for a very high degree of control of the magnetic gradient field that is produced by the mechanical gradient magnetic field generator.

In another embodiment the one or two displacement directions is a single displacement direction. This embodiment may be beneficial because it may provide for a simpler mechanical gradient magnetic field generator as well as one that is very stable mechanically.

In another embodiment the one or two displacement directions is two displacement directions. The at least one generator has any one of the following shapes: a planar shape, a spherical section shape, and a cylindrical section shape. Both the planar, spherical section and the cylindrical section each have two degrees of freedom which the dividers may move relative to each other.

In another embodiment at least a portion of the set of rotatable magnets and the additional set of magnets, if present, have a maximum dimension between 0.1 mm and 1.2 mm. This embodiment may be beneficial because the magnets are large enough that they produce an effective gradient magnetic field but they are also small enough so that the forces on them, particularly when they are moved from one position to another during operation is limited. This means that the potential energy stored when the movable divider moves from one position to another is limited.

In another embodiment the at least a portion of the set of rotatable magnets and the additional set of magnets, if they are present, have a maximum dimension preferably between 0.2 mm and 1.0 mm. In this embodiment the forces on the set of rotatable magnets and the additional set of magnets are limited even further.

In another embodiment each of the at least one generator layer further comprises an additional divider. The additional divider is stationary relative to the stationary divider. The moveable divider is between the additional divider and the stationary divider. Each of the at least one generator layer further comprises an additional set of magnets positioned between the moveable divider and the additional divider. The additional set of magnets are mechanically coupled to the moveable divider and to the additional divider.

The mechanical coupling of the additional set of magnets is such that the movement of the moveable divider in the one or two displacement directions causes an individual rotation of each of the additional set of magnets. This embodiment may be beneficial because the single movement of the moveable divider causes a rotation of both the set of rotatable magnets as well as the additional set of magnets. This enables the additional set of magnets and the rotatable set of magnets to operate in concert. For example, they can be arranged such that in one position the magnetic fields from the magnets mostly cancel out. This may aid in installing the mechanical gradient magnetic field generator into a magnet that is currently generating a magnetic field as well as providing a larger degree of control over the magnetic gradient field that the mechanical gradient magnetic field generator produces.

In another embodiment the additional set of magnets and the set of rotatable magnets rotate in opposite directions. For example, the two sets of magnets may have axes of rotations that are parallel to each other.

In another embodiment the at least one generator layer is multiple generator layers and some of the stationary dividers of one layer is an additional divider in another layer. Likewise, an additional divider in one layer may be a stationary divider in another of the generator layers.

In another embodiment each of the set of rotatable magnets and the additional set of magnets has a dipole moment. In the initial position a vector sum of the dipole moments of the set of rotatable magnets and the additional set of magnets is less than 10% of a magnitude sum of the dipole moment of the set of rotatable magnets and the additional set of magnets. In the initial position the vector sum is preferably less than 1% of the magnitude sum. The magnitude sum in other words would be simply an addition of the dipole moment of each of the set of rotatable magnets and the set of additional magnets ignoring their vector nature. In the initial position the various magnets and the set of rotatable magnets and the set of additional magnets are positioned such that the vector sum of all the dipole moments is less than 10% or less than 1% of this magnitude sum.

This means that in the initial position the magnets are to a very large degree, cancelling each other's magnetic field. This enables the magnetic gradient field produced by the mechanical gradient magnetic field generator to essentially be shut off or mostly eliminated. This has benefits of reducing the gradient field when it is not being used as well as making it easier to take in and out of an operating magnet or main magnet of the magnetic resonance imaging system.

In another embodiment the moveable divider has an initial position. The set of rotatable magnets as well as the set of additional magnets, if they are present, are configured to generate a gradient magnetic field adjacent to the field generating element when rotated by motion of the moveable divider away from the initial position.

In another embodiment the mechanical gradient magnetic field generator further comprises a locking mechanism for holding the field generating element in the initial position. This may for example be particularly useful when placing the magnetic gradient field generator into an operating main magnet of the magnetic resonance imaging system. For example, the mechanical gradient magnetic field generator may be a separate component that is placed into the main magnet or it may also be integrated into a magnetic resonance imaging coil or antenna. The use of the locking mechanism may facilitate moving the mechanical gradient magnetic field generator into a main magnet.

In another embodiment the at least one generator layer is at least 8 generator layers. The use of a larger number of generator layers for example enables the use of smaller magnets. As was mentioned previously, the use of smaller magnets reduces the force on individual magnets, particularly when going through a region of extremely large magnetic field gradient.

In another embodiment the at least one generator layer is at least 15 generator layers. The use of 15 generator layers may enable a larger gradient field to be produced.

In another embodiment the at least one generator layer is preferably greater than 20 generator layers. This for example may enable the use of even smaller magnets to produce the same sized gradient magnetic field.

In another embodiment the mechanical gradient magnetic field generator further comprises an actuator configured for simultaneously moving the moveable divider of each of the at least one generator layers in the one or two displacement directions. This for example may be advantageous because it may enable automated control of the mechanical gradient magnetic field generator.

The actuator may actually be more than one actuator. For example, there may be an actuator for each displacement direction.

In another embodiment the actuator is a mechanical actuator.

In another embodiment the actuator is a piezoelectric actuator.

In another embodiment the actuator is an electromagnetic actuator. For example, a coil can be wrapped around the mechanical gradient magnetic field generator and this magnetic field can cause the rotation and movement of the set of rotatable magnets. One thing which enables this is the use of the mechanical element that mechanically assists movement in the one or two displacement directions towards the initial position. The mechanical element can be chosen so that the forces are almost balanced and only a minor force is needed. Likewise, the actuator can also be a magnetic field coil system. For example, it may be the coil-based magnetic gradient coil system in a standard magnetic resonance imaging system. Instead of actually producing the gradient magnetic fields, the gradient coils can instead be used to actuate the mechanical gradient magnetic field generator. This of course has advantages in that no modifications to the magnetic resonance imaging system need to be made and there is no need to add additional wires or mechanical actuators.

In another aspect the invention provides for a magnetic resonance imaging system that is configured to acquire k-space data from a subject at least partially within an imaging zone. The magnetic resonance imaging system comprises a mechanical gradient magnetic field generator that comprises an actuator. The mechanical gradient magnetic field generator is configured to generate the gradient magnetic field at least partially within the imaging zone. The magnetic resonance imaging system further comprises a memory storing machine-executable instructions and pulse sequence commands. Pulse sequence commands are commands or data which may be converted into commands which contain the individual instructions used to control the magnetic resonance imaging system to acquire k-space data. For example, the pulse sequence commands are typically displayed as a timing diagram indicating the control sequence of various components of the magnetic resonance imaging system.

The magnetic resonance imaging system further comprises a computational system configured to control the magnetic resonance imaging system. Execution of the machine-executable instructions further causes the computational system to acquire the k-space data by controlling the magnetic resonance imaging system with the pulse sequence commands. The pulse sequence commands are configured to generate the gradient magnetic field by controlling the actuator. This for example may be controlling an actual actuator or in some cases it may be controlling an existing set of coils for generating a gradient magnetic field as was described above how this can be used to actuate the mechanical gradient magnetic field generator.

In another embodiment execution of the machine-executable instructions further causes the computational system to reconstruct an image or magnetic resonance image from the k-space data.

In another embodiment the magnetic resonance imaging system further comprises a magnet for generating a main magnetic field. The mechanical gradient magnetic field generator is configured such that the generation of the gradient magnetic field requires less energy than a gradient magnetic field coil system. This for example may be accomplished by having a mechanical element that partially balances the forces of the field of the main magnet against the set of rotatable magnets.

In another embodiment the mechanical element is configured to balance the forces on the moveable divider by the set of rotatable magnets within a predetermined force threshold when the mechanical gradient magnetic field generator is within the main magnetic field. This may also be true when the mechanical gradient magnetic field generator comprises the additional divider and the additional set of magnets. The mechanical element can be chosen such that force needed to move the moveable divider is less than the predetermined force threshold. This may be beneficial because it may enable the generation of the gradient magnetic field with a minimal amount of force and thus a large savings on energy.

In another embodiment the magnetic resonance imaging system further comprises a main magnet. The magnetic resonance imaging system further comprises a magnetic shield configured for shielding the main magnet from the mechanical gradient magnetic field generator. This may be beneficial because it may reduce the effect of the mechanical gradient magnetic field generator on the main magnet.

In another embodiment the magnetic shield is an active magnetic shield.

In another embodiment the magnetic shield is a mechanical magnetic shield formed from one or more of the field generating elements. For example, if there are multiple layers some of the layers towards the main magnet may be designed such that they function as a magnetic shield.

In another embodiment the magnetic resonance imaging system comprises a subject support configured for supporting at least a portion of the subject in the imaging zone. The mechanical gradient magnetic field generator is at least partially integrated into the subject support. This may for example be particularly beneficial when the mechanical gradient magnetic field generator is planar. Integrating this into the subject support may provide a means of providing more room within the bore of the magnet if the coils can be eliminated.

In another embodiment the moveable divider comprises an array of temperature sensors and an array of heating elements. The machine-executable instructions are configured to control the computational system to regulate a temperature of the multiple pairs of adjacent magnets using the array of temperature sensors and the array of heating elements. This may be beneficial because it may provide for a means of better controlling the gradient magnetic field that is generated.

In another embodiment the computational system is further configured for magnetically shimming the imaging zone by modifying the temperature of the multiple pairs of adjacent magnets using the array of temperature sensors and the array of heating elements. This may provide for a means of fine tuning the main magnetic field and may provide for improved image quality when performing magnetic resonance imaging.

In another embodiment the moveable divider comprises an array of temperature sensors, sensing the temperatures of the corresponding magnets during system operation. In addition, or alternatively the movable divider comprises at least one position sensor, that is configured to monitor the current position of the individual magnets or the movable divider in real-time during the acquisition of the k-space data. In some examples data from the array of temperature sensors and/or the one or more position sensors is stored along with the k-space data to use them in an appropriate model-based MR reconstruction compensating for corresponding run-time effects. This may have the benefit of providing a more accurate reconstruction of magnetic resonance images from the k-space data.

In another embodiment the machine-executable instructions are configured to control the computational system to determine a calibration of the mechanical actuator from one or more test magnetic resonance images. For example, this may provide a means of more accurately controlling the mechanical gradient magnetic field generator.

In another embodiment the determination of the calibration of the mechanical actuator comprises operating the actuator to determine a desired gradient magnetic field, acquiring test k-space data of a predetermined object such as a phantom. Determining the calibration of the magnetic actuator further comprises checking the deviation of the image from an ideal image which would then be expected to have the desired gradient field. Then the step is to use this deviation of the image to calculate the actuator to compensate for the deviation thereby providing the calibration.

In another embodiment the one or more test magnetic resonance images are phantom magnetic resonance images. The determining of the calibration of the magnetic actuator comprises receiving the calibration response to inputting the one or more test magnetic resonance images into a trained neural network. For example, the neural network could be trained to take a desired field and then input the test image and then output the calibration. The trained neural network could for example be trained by taking known gradient magnetic fields and producing training data.

In another aspect the invention provides for a magnetic resonance imaging coil that comprises a magnetic gradient field generator according to an embodiment. This embodiment may be beneficial because the mechanical gradient magnetic field generator may be very compact and may be easily integrated into a magnetic resonance imaging coil. This may provide for more flexibility with a magnetic resonance imaging system.

In another embodiment the magnetic resonance imaging coil is a head coil.

In another embodiment the magnetic resonance imaging coil is a body coil.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

K-space data is defined herein as being the recorded measurements of radio frequency signals emitted by atomic spins using the antenna of a Magnetic resonance apparatus during a magnetic resonance imaging scan.

A Magnetic Resonance Imaging (MRI) image or MR image is defined herein as being the reconstructed two- or three-dimensional visualization of anatomic data contained within the k-space data. This visualization can be performed using a computer.

BRIEF DESCRIPTION OF THE DRAWINGS

In the following preferred embodiments of the invention will be described, by way of example only, and with reference to the drawings in which.

DESCRIPTION OF EMBODIMENTS

Like numbered elements in these figures are either equivalent elements or perform the same function. Elements which have been discussed previously will not necessarily be discussed in later figures if the function is equivalent.

MRI spatial encoding is typically provided mostly be magnetic field gradient coil that are built into the walls of the MR system. These take up considerable bore space are expensive and require expensive amplifiers. Because of the weight and power required, local gradient systems, e.g. for the brain, have never been productized.

The use of a multitude of tiny magnets (set of rotatable magnets) which collectively can be adjusted to move from no gradient to a strong gradient. Permanent magnetic spheres or cylinders may for example be held between dividers or plates. When moving a movable plate mechanically, the set of rotatable magnets may rotate generating a change in the external magnetic field. Using tiny spheres and lightweight and stiff material (for the dividers) may minimize the kinetic energy during the magnetization change. A spring system (mechanical element) may minimize the energy difference between the different positions of the movable plate. In total a relatively small power may be needed to change the magnetic field and hold it, allowing for high frequency operation, low cost drive systems and may avoid or reduce the need for a cooling system.

Figure 1:
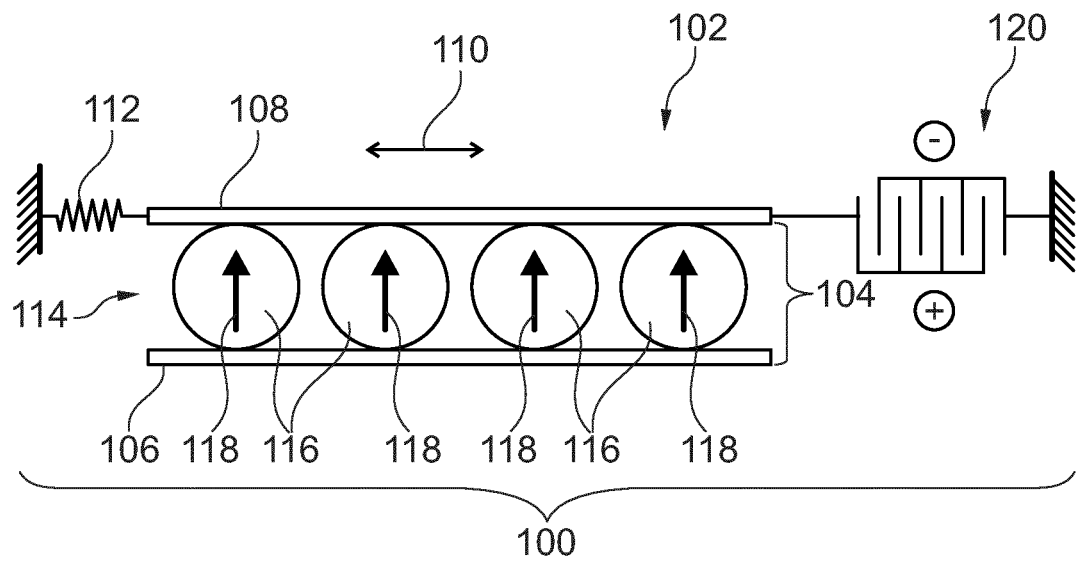
FIG. 1 illustrates an example of a mechanical gradient magnetic field generator.

FIG. 1 illustrates an example of a mechanical gradient magnetic field generator 100. The mechanical gradient magnetic field generator 100 is shown as comprising a field generating element 102. In this example the field generating element 102 comprises a single generator layer 104. Multiple layers 104 could be stacked on top of each other. There is a stationary divider 106 that remains stationary or fixed and a moveable divider 108 which is able to move in a displacement direction 110. For operation of the mechanical gradient magnetic field generator, the relative position of the stationary divider 106 and the movable divider 108 determines the magnetic field generated by the mechanical gradient magnetic field generator 100. It could be possible for the stationary divider 106 to move also, however since the relative motion between the stationary divider 106 and the movable divider 108 is relevant, one of the dividers (the stationary divider 106) is assumed to be stationary.

There is a mechanical element 112 which assists the movement of the moveable divider 108 to return to an initial position. Between the stationary divider 106 and the moveable divider 108 is a set of rotatable magnets 114 that is made up of rotatable magnets 116 that each have a direction of the magnetic dipole 118.

There is a piezoelectric actuator 120 that is attached to the moveable divider 108. When the piezoelectric actuator 120 moves the moveable divider 108 the mechanical element 112 or spring in this case will tend to pull the moveable divider 108 back to the initial position. When the moveable divider 108 moves it causes the individual magnets 116 to rotate thus re-orientating the direction of the magnetic dipole 118.

Figure 2:
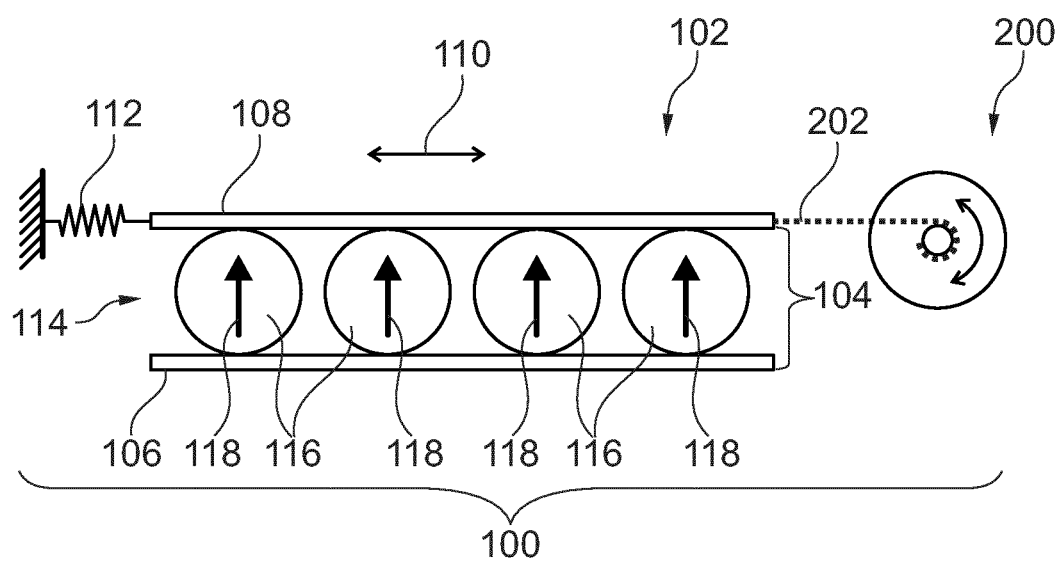
FIG. 2 illustrates a further example of a mechanical gradient magnetic field generator.

FIG. 2 shows a further example of the mechanical gradient magnetic field generator 100. The example in FIG. 2 is very similar to the example illustrated in FIG. 1 except the actuator is now a mechanical actuator 200. For example, it could be a motor or stepper motor or other mechanical actuator such as a pneumatic or hydraulic motor or actuator that is located at a remote position to the moveable divider 108. The moveable divider 108 is connected to the mechanical actuator 200 with a cable 202.

Figure 3:
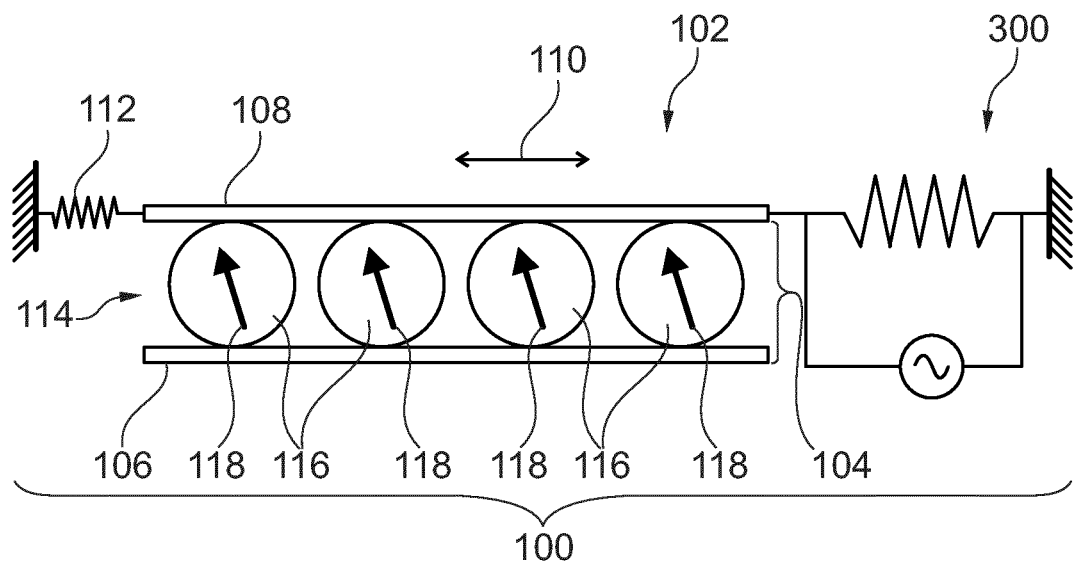
FIG. 3 illustrates a further example of a mechanical gradient magnetic field generator.

FIG. 3 illustrates a further example of mechanical gradient magnetic field generator 100. The example illustrated in FIG. 3 is similar to that illustrated in FIGS. 2 and 1 except in this case the actuator is a thermal mechanical actuator 300. There is a voltage source which is used to control the thermal mechanical actuator 300 and adjust the position of the moveable divider 108 in the displacement direction 110. The thermal mechanical actuator 300 could be implemented in several different ways. It could comprise a heating element for heating, comprise a thermoelectric device or Peltier element for heating and/or cooling, and/or comprise a cooling system such as an air or fluid cooling system.

Figure 4:
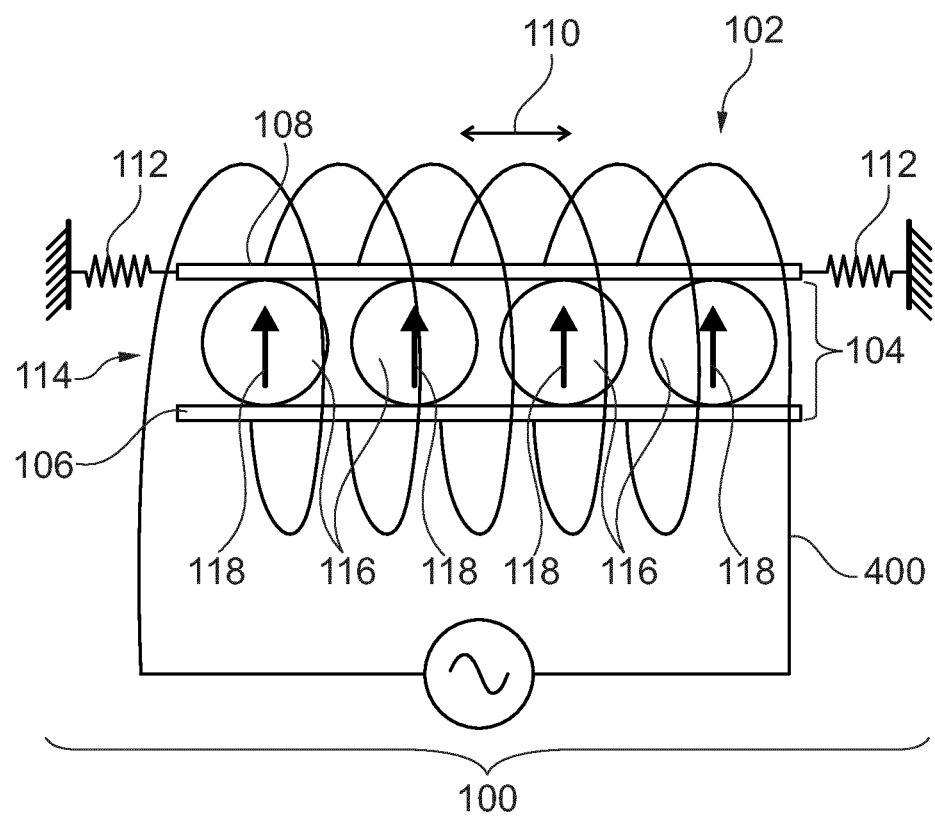
FIG. 4 illustrates a further example of a mechanical gradient magnetic field generator.

FIG. 4 illustrates a further example of mechanical gradient magnetic field generator 100. The example illustrated in FIG. 4 is very similar to the examples illustrated in FIGS. 1, 2, and 3. In this case the actuator is an electromechanical actuator 400. The moveable divider 108 is connected to mechanical elements 112 or springs in either side and a magnetic field generated by the electromechanical actuator 400 causes the magnets 116 to rotate and thereby move the moveable divider 108. The electromechanical actuator 400 could represent an actual coil wound around the field generating element 102 or it could also be a gradient coil system in a magnetic resonance imaging system.

Figure 5:
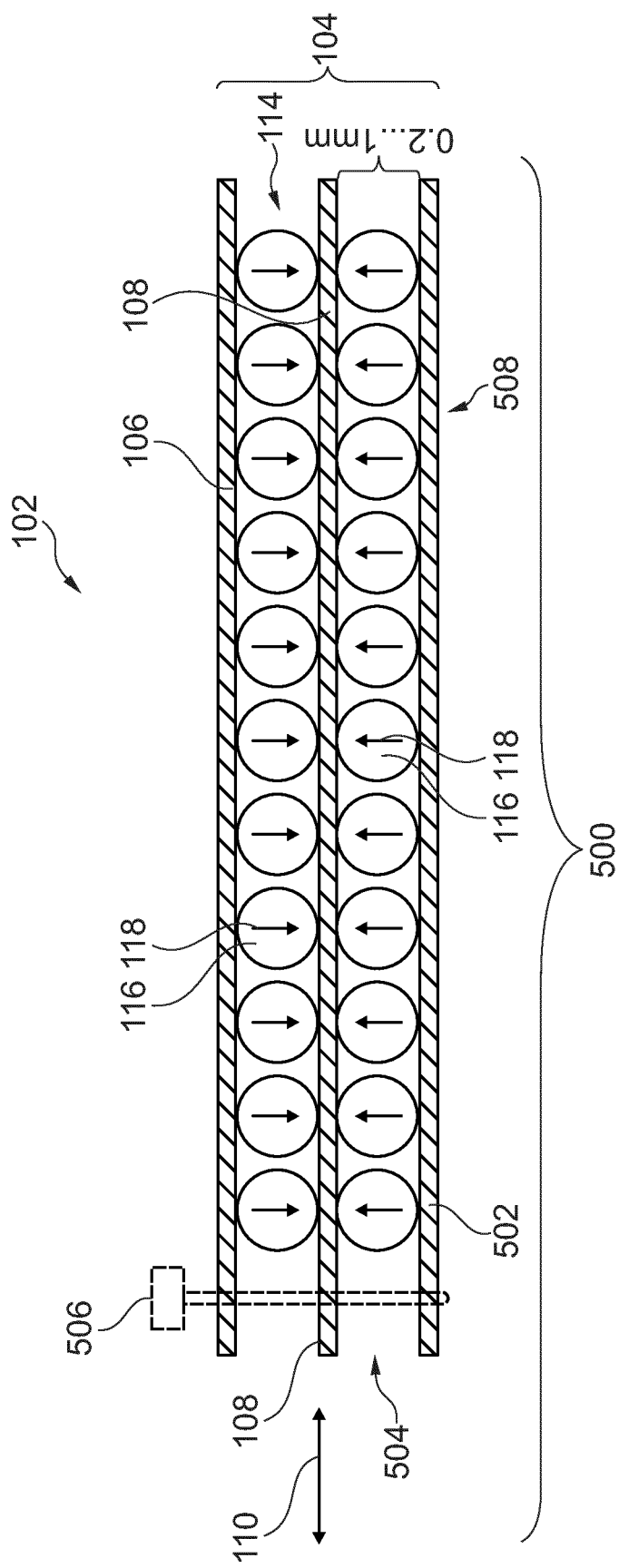
FIG. 5 illustrates a further example of a mechanical gradient magnetic field generator.

FIG. 5 illustrates a further example of mechanical gradient magnetic field generator 500. In this example the actuator and the mechanical element are not depicted. In this example, in addition to the stationary divider 106 and the set of rotational magnets 114, there is now an additional divider 502. The moveable divider 108 is between the stationary divider 106 and the additional divider 502. The additional divider 502 is stationary relative to the stationary divider 106. Between the moveable divider 108 and the additional divider 502 there is an additional set of magnets 504 that also comprise individual rotatable magnets 116 with a direction of the magnetic dipole 118. When the moveable divider 108 is moved in the movement direction 110 it causes the set of rotatable magnets 114 and the additional set of magnets 504 to individually rotate. In this example it can be seen that the magnets 116 in the two layers have their dipole moments 118 in opposing directions. In this case, from a distance from the mechanical gradient magnetic field generator 500, the magnetic fields will cancel. As the moveable divider 108 is moved in the movement direction 110, the dipoles 118 are no longer aligned and there will result a net magnetic field. It can be seen that the diameter of the magnets is between 0.2 and 1 mm. This aids in reducing the effect of the large magnetic field on the magnets 116, particularly when they are being moved in and out of a main magnetic.

In FIG. 5 the moveable divider 108 is in the initial position 508. The mechanical gradient magnetic field generator 500 is also shown as containing an optional locking mechanism 506 which is in the form of a pin, which has been inserted through the stationary divider 106, the moveable divider 108, and the additional divider 502. This holds the position of the moveable divider 108 stationary with respect to the stationary divider 106 and the additional divider 502. This for example may be useful when moving the mechanical gradient magnetic field generator 500 in/out of a main magnet.

In the configuration of FIG. 5, the net magnetic field is nearly zero at a distance large compared to the scale of the magnet spheres. By adjusting the position and/or orientation of the spheres, in the example above, by moving the center plate (movable divider 108), a net field can be produced by making the dipoles line up in the same direction.

Figure 6:
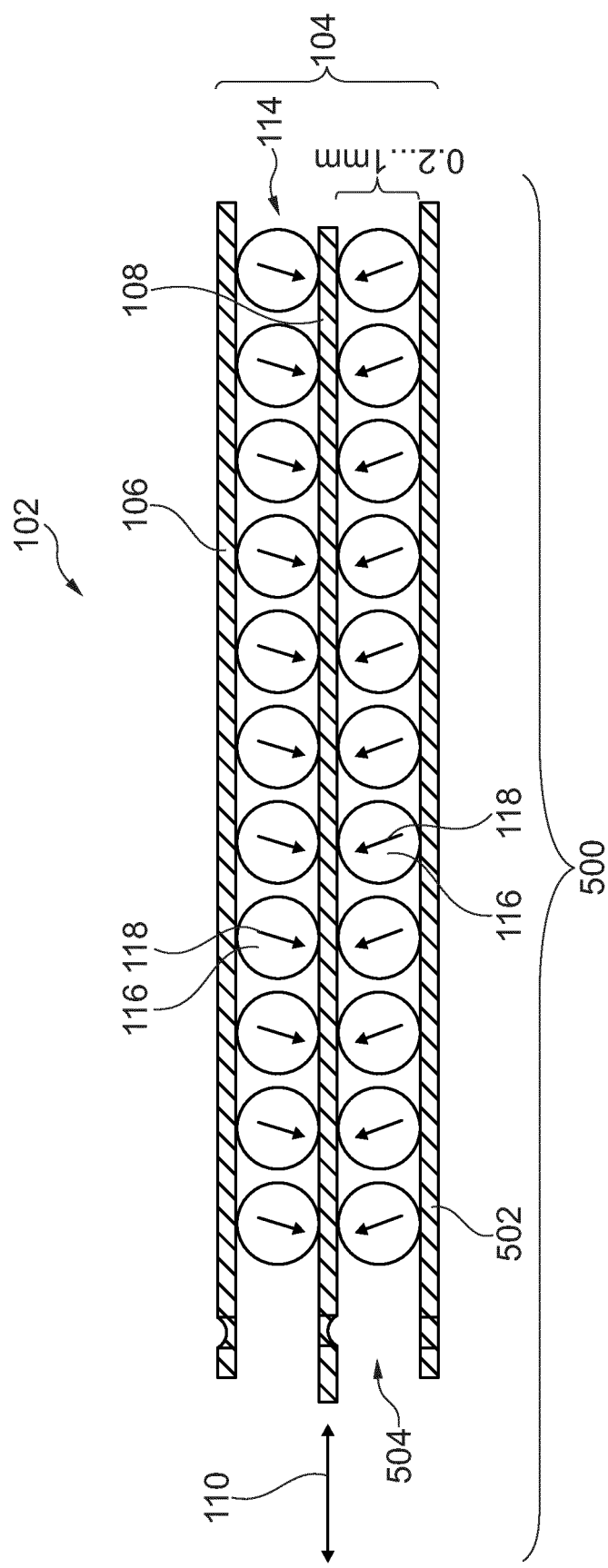
FIG. 6 illustrates a further example of a mechanical gradient magnetic field generator.

FIG. 6 shows a further view of the mechanical gradient magnetic field generator 500 after the moveable divider 108 has been moved in direction 110. It can be seen this has caused the magnets 116 to rotate and the direction of the magnetic dipoles 118 has also rotated. The dipoles 118 no longer cancel effectively resulting in the generation of a gradient magnetic field.

An array of such mechanical gradient magnetic field generators 100, 500 can produce gradient fields as an alternative to strong currents traditionally used for generating the fields. Field shaping could be done using variations in starting angles for the dipoles, multiple layers, irregular spacing between the dipoles and a variety of other similar approaches. In this case, a cancelling force such as is provided by a mechanical element 112 could be used to minimize the force and power requirements for switching. Local shimming might also be possible with such an approach.

Figure 7:
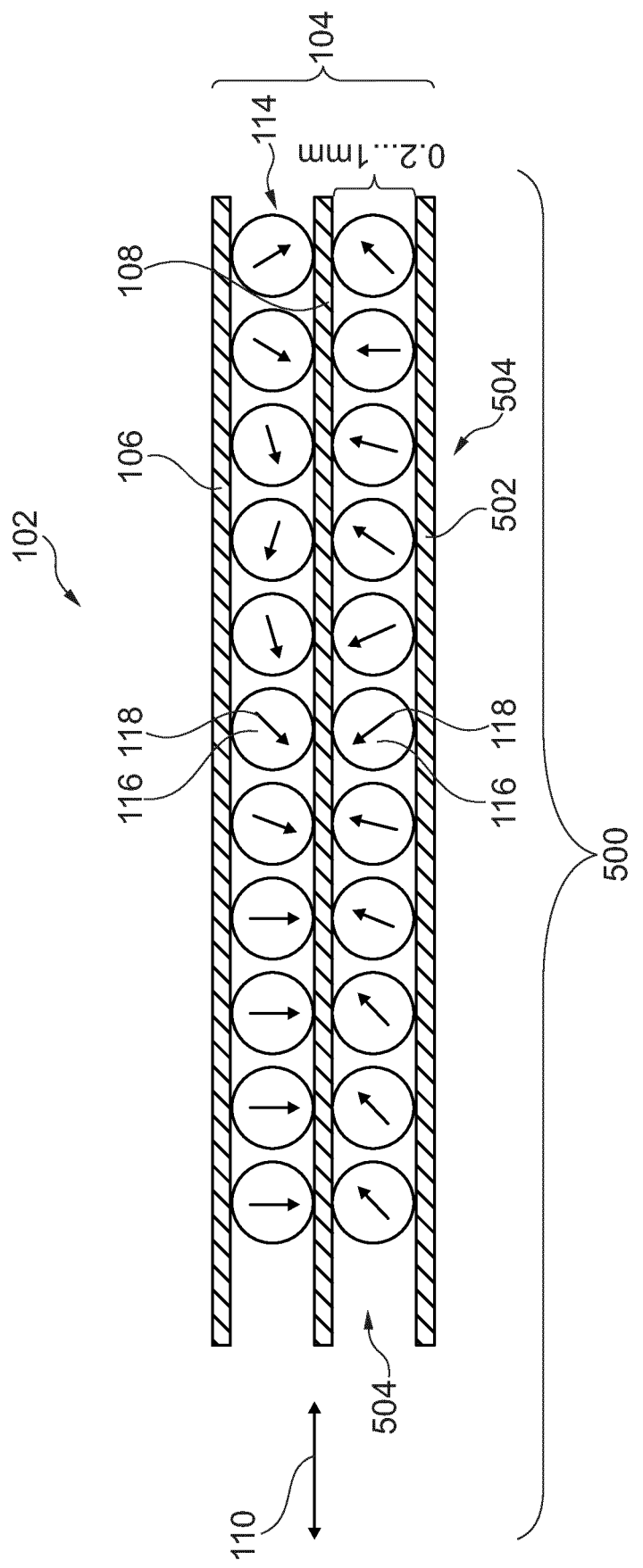
FIG. 7 illustrates a further example of a mechanical gradient magnetic field generator.

FIG. 7 shows a further view of the mechanical gradient magnetic field generator 500. The example in FIG. 7 is in the initial position 508 again and is a modification of the example shown in FIG. 5. In FIG. 5 the dipoles in the set of rotatable magnets 114 and the additional set of magnets 504 are opposed to each other to cancel the magnetic field as much as possible. In the example illustrated in FIG. 7 some of the magnetic dipoles have been rotated relative to each other. This enables the local shimming of the main magnetic field. As the moveable divider 108 moves in the displacement direction 110 the magnets 116 still rotate but they are no longer aligned as they were in FIG. 5. The rotational position of individual magnets 116 can be chosen to tailor the desired gradient field and/or to perform a shimming functionality.

As an example of mass, a head gradient system might weigh as little as 5 kg with the magnets weighing on the order of 2 kg. Net force and torques may be considered carefully in design. The amount of magnetic material also has safety implications in the event of failure. The smaller the unit, the less risk, e.g. a single dimensional gradient system for diffusion of the breast could be low mass.

The actuation of the device can be realized by any known actuators 112 e.g. piezoelectric actuators. However, it is also possible to incorporate the device simply into a conductor coils (such as gradient coils) and let the magnetic forces actuate the device. For this, it may be possible to compensate the magnetic force in the high B0 field on the middle plate by appropriate spring forces. The force may be non-linear and non-linear springs could possibly be used. An elegant way to compensate the forces is to also use a magnetic force with the same non-linearity. This can be combined in a magnet system with the portion of the device used for "active shielding" i.e. to compensate the magnetic fields outside the insert gradient assembly. The mechanical coupling also ensures that the total forces and torques on the device are always sufficiently low. Nevertheless, it may be beneficial to also include some mechanical springs to compensate the self-field energy i.e. to reduce the demagnetization factor. Thereby the required power to operate the device can be lowered.

As it may be beneficial to maintain the field homogeneity of the B0, it may be advantageous to incorporate heating elements to compensate for thermal drift in the hard magnetic spheres (set of rotatable magnets). These heating elements could have a second purpose to compensate the net forces on the middle plate and make the device operate with low power.

As the mechanical gradient magnetic field generator 100, 500 may benefit from delicate adjustment, its effect has to be measured. For this, displacement sensors (for the middle plate) may be used e.g. optical sensors. However, it may be convenient to measure the local magnetic field by appropriate sensors. With such a feedback-system, it is feasible to divide the gradient assembly in a multitude of sub-units each with its own coil for actuation. This makes the design of the gradient assembly simpler and allows for more freedom to compensate the drifts and nonlinearities encountered in the mechanical gradient magnetic field generator 100, 500.

FIGS. 8, 9, 10 and 11 are used to illustrate several means of providing mechanical coupling between the rotatable magnets 116 of the set of rotatable magnets 114 and/or the additional set of magnets 504 with the moveable divider 108 and/or the stationary divider 106 and/or the additional divider 502. The examples in FIGS. 8-11 are explained in terms of the set of rotatable magnets 114 and the stationary divider 106 and the moveable divider 108, but they are also applicable to the mechanical coupling between the additional set of magnets 504 with the additional divider 502 and the moveable divider 108.

Figure 8:
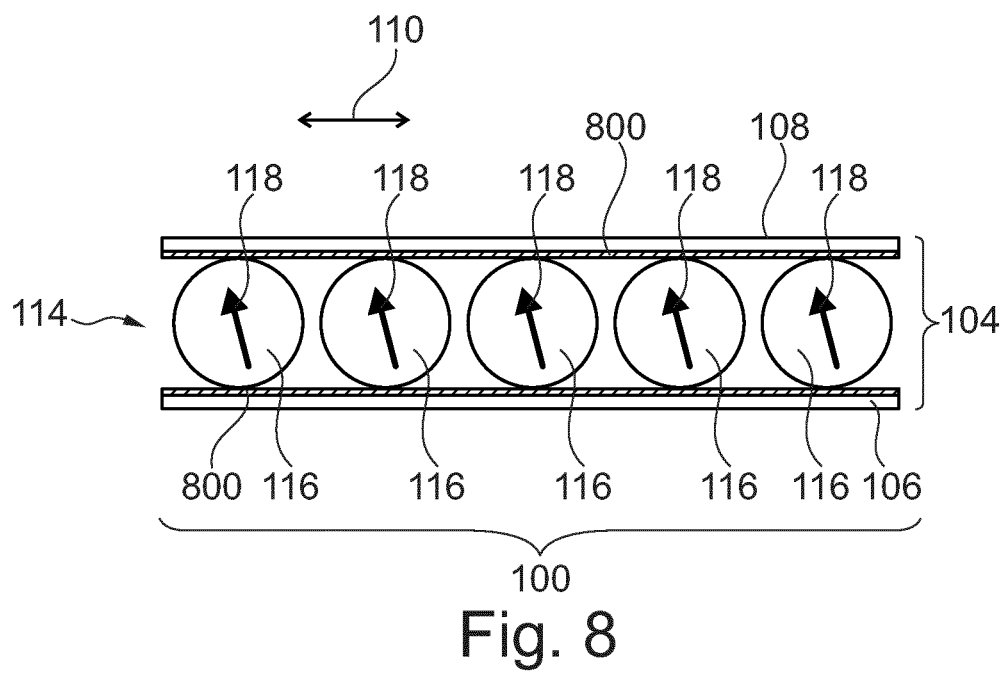
FIG. 8 illustrates a further example of a mechanical gradient magnetic field generator.

FIG. 8 shows a further view of a mechanical gradient magnetic field generator 100. Details about the actuator and mechanical element are not depicted in FIGS. 8-11. The example illustrated in FIG. 8 is similar to that illustrated in FIG. 1. To ensure that the magnets 116 rotate when the moveable divider 108 is moved in the movement direction 110, there is additionally an additional frictional layer 800 mounted on the surface of the moveable divider 108 and the stationary divider 106 facing the set of magnets 114. This provides additional friction and ensures that the magnets do not slip and that they rotate as they should when the moveable divider 108 is moved. This frictional layer 800 could for example be a sticky adhesive-like material or it may also be an additional layer such as a rubber which increases the friction. This frictional layer 800 could alternatively be mounted on the surface of the rotatable magnets 116. In yet other examples the frictional layer 800 would be mounted on both the magnets 116 and on the moveable divider 108 and stationary divider 106 as is depicted in FIG. 8.

Figure 9:
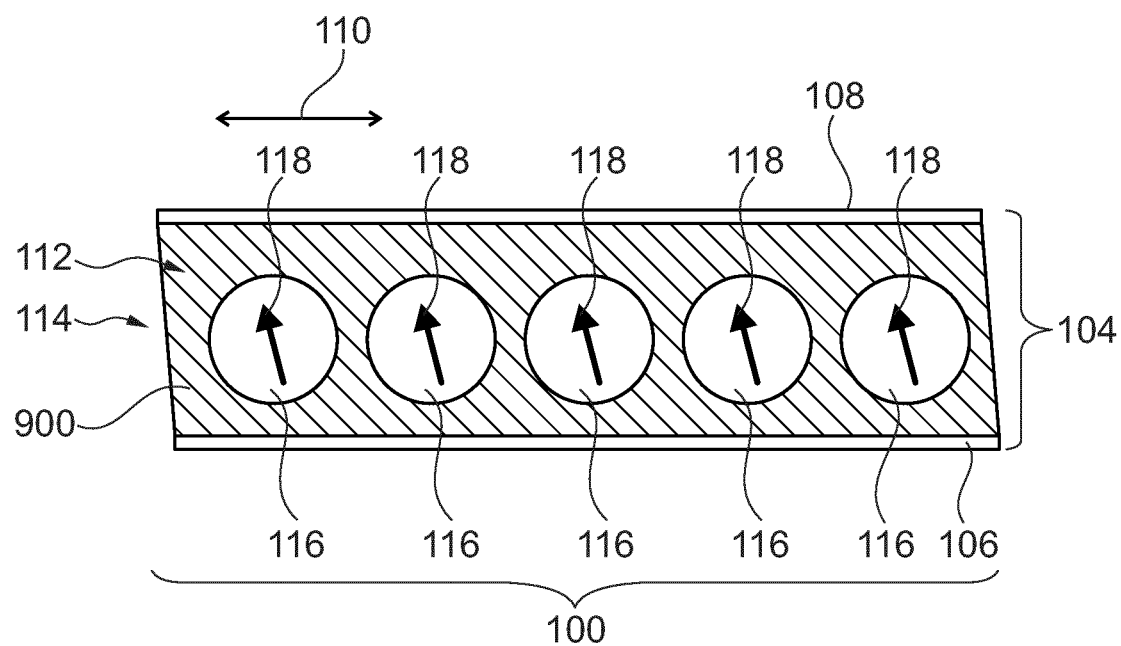
FIG. 9 illustrates a further example of a mechanical gradient magnetic field generator.

FIG. 9 illustrates an alternative method of coupling the rotatable magnets 116 to the stationary divider 106 and the moveable divider 108. In this example there is a plastic material 900 filling the space between the stationary divider 106 and the moveable divider 108. The magnets 116 are embedded within this clastic material 900. As the moveable divider 108 is moved in the movement direction 110 the clastic material 900 deforms and the rotatable magnet 116 is rotated. One advantage of this embodiment is that the clastic material 900 naturally functions as the mechanical element 112 or spring illustrated in other embodiments. Springs or other elastic elements may still be included but the clastic material 900 naturally performs this function. Another advantage of using the clastic material 900 is that the shape of the rotatable magnets 116 becomes arbitrary. The magnets 116 are still depicted as being round 116 in this image, however, they could be cube or rectangle-shaped and actually it would be advantageous to have them be non-round because this would help reduce the chance that the magnets 116 are accidentally rotated by the main field of a magnetic resonance imaging system.

Figure 10:
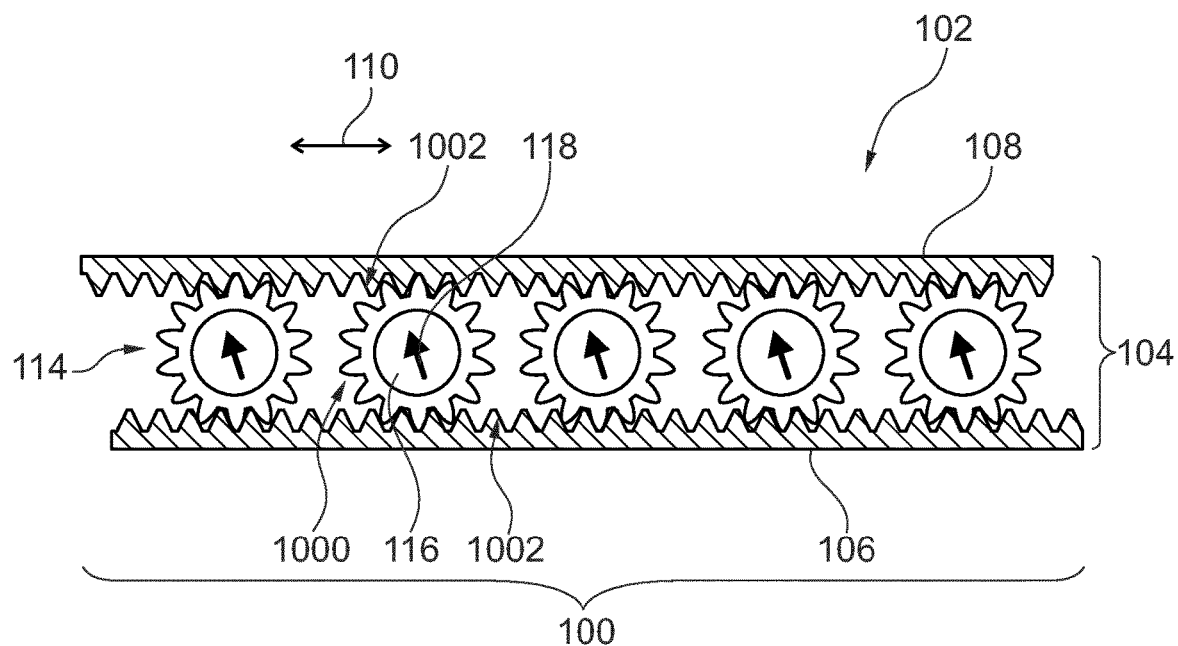
FIG. 10 illustrates a further example of a mechanical gradient magnetic field generator.

FIG. 10 illustrates a further method of coupling the magnets 116 mechanically to the stationary divider 106 and the moveable divider 108. In this example, the magnets 116 now have gear teeth 110 on them. There are mating gear teeth 1002 on the moveable divider 108 and the stationary divider 106. This provides a very effective mechanical coupling and may prevent accidental rotation of the magnets 116 even in a large main magnetic field. This may be constructed in several different ways. In some examples the rotatable magnets 116 have the gear teeth formed on them directly. The gear teeth are formed from magnetic material. In other examples a magnet 116 can be embedded in a gear formed from plastic or some other material.

Figure 11:
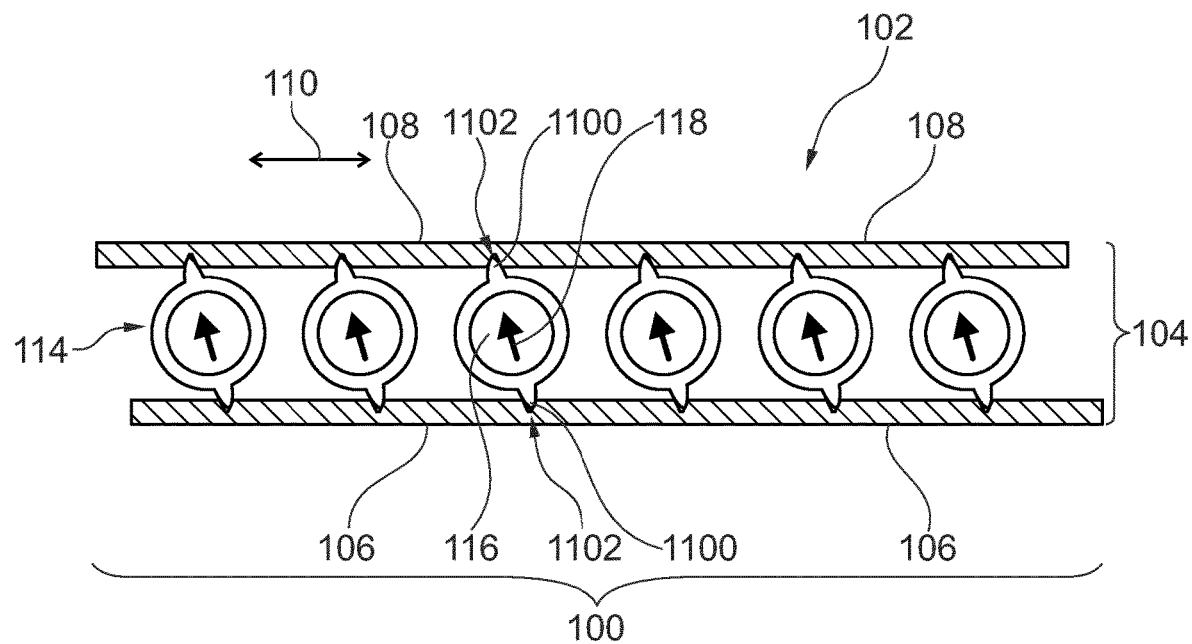
FIG. 11 illustrates a further example of a mechanical gradient magnetic field generator.

FIG. 11 illustrates a further method of mechanically coupling the magnets 116 to the moveable divider 108 and the stationary divider 106. In order to generate a gradient magnetic field the magnets 116 do not need to be rotated very much. In some examples a rotation of 15°, 30° or even less than 45° is sufficient. The embodiment shown in FIG. 11 is similar to FIG. 10 except in this case there are ridges 1100 which mate with notches 1102 in the stationary divider 106 and the moveable divider 108. As the moveable divider 108 is moved in the motion direction 110, the magnets 116 rotate by tilting. The spacing between the moveable divider 108 and the stationary divider 106 will change but for example a spring system can be used to maintain proper tension between the two.

Figure 12:
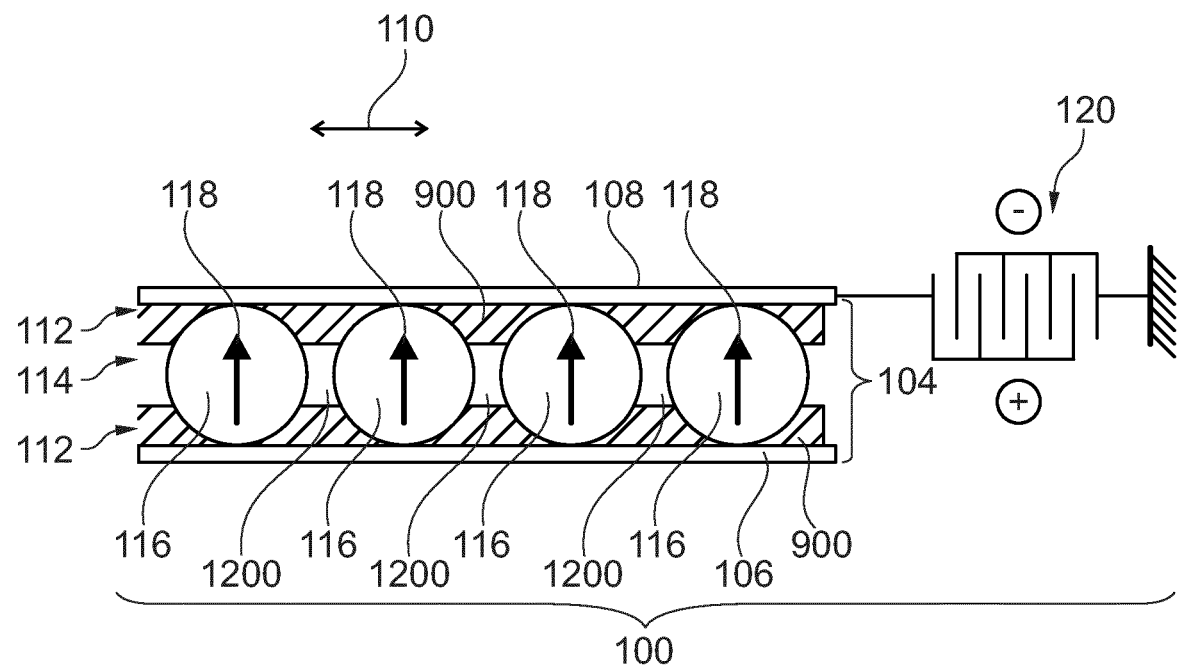
FIG. 12 illustrates a further example of a mechanical gradient magnetic field generator.
Figure 13:
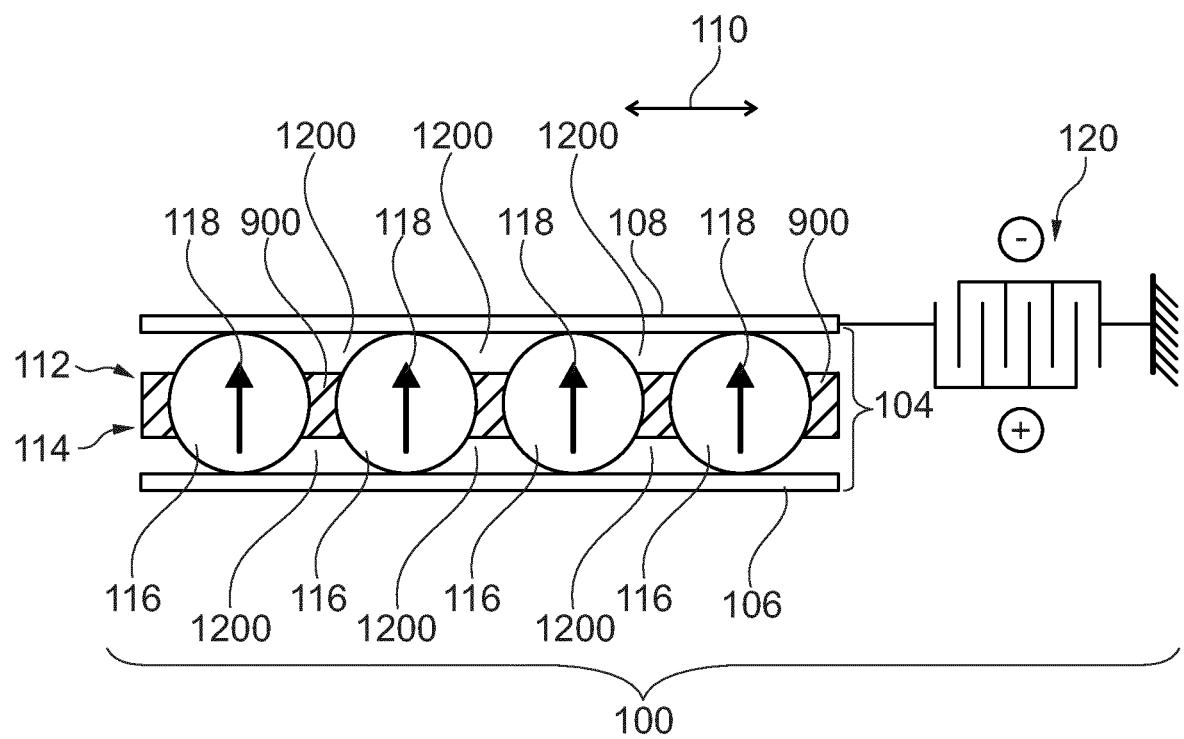
FIG. 13 illustrates a further example of a mechanical gradient magnetic field generator.

FIGS. 12, 13, 14, and 15 illustrate alternative examples of how to construct the mechanical element 112 for returning the moveable divider 108 to the initial position 508. Examples illustrated in FIGS. 12-15 apply when there is both a single set of rotatable magnets 116 as well as when there is a set of rotatable magnets 116 as well as an additional set of magnets 504. In FIG. 9 the material 900 functioned at least partially as a mechanical element 112. FIGS. 12 and 13 illustrate modifications of the example illustrated in FIG. 9. In FIG. 12 the entire volume between the moveable divider 108 and the stationary divider 106 is not filled. The elastic material 900 covers the surface of the moveable divider 108 and a portion of the magnet 116. There is another section of elastic material 900 that covers the surface of the stationary divider 106 and another portion of the magnets 116. Leaving an open space 1200 may be used to adjust how springy the mechanical element 112 is.

FIG. 13 shows a further alternative. In this example the elastic material 900 forms a band connecting the magnets 116 together. There are then open spaces 1200 adjacent to the moveable divider 108 and the fixed divider 106. This band of elastic material 900 also functions as the mechanical element 112.

Figure 14:
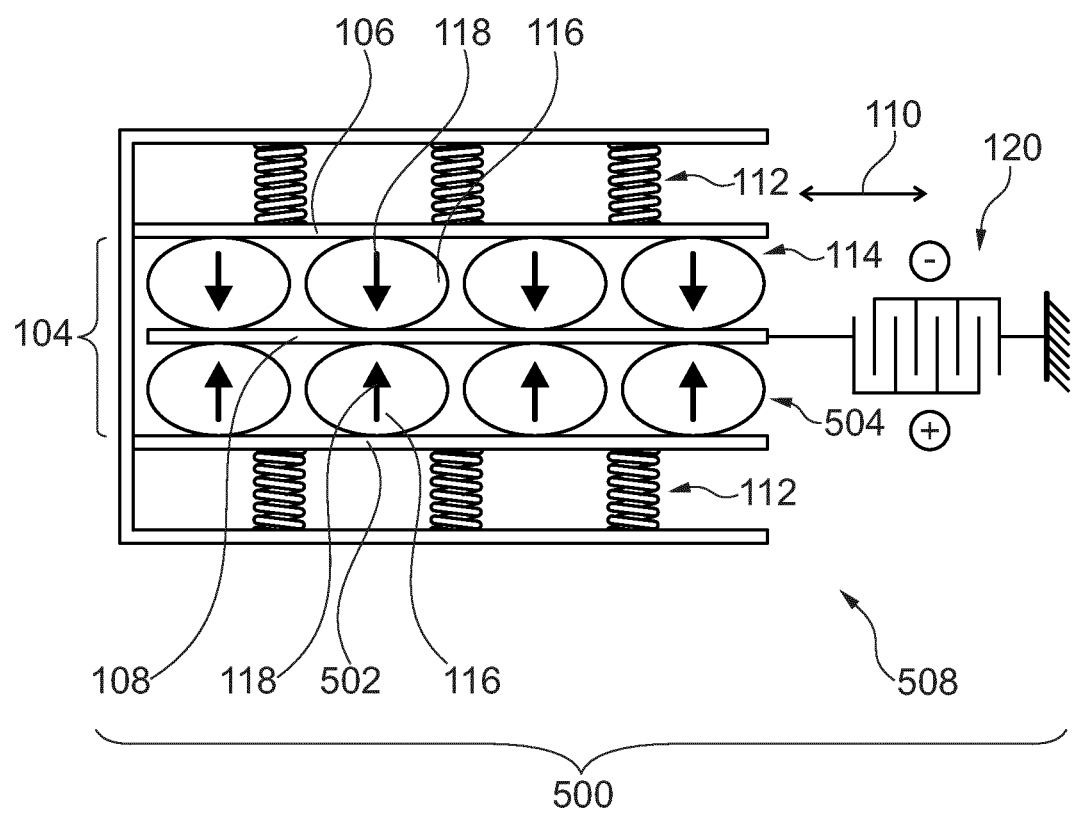
FIG. 14 illustrates a further example of a mechanical gradient magnetic field generator.

FIG. 14 illustrates a further example of a mechanical gradient magnetic field generator 500. In this example the moveable divider 108 is used to rotate both the set of rotatable magnets 114 and the additional set of magnets 504 simultaneously. In order to provide a restoring force to put the moveable divider 108 back into its initial position 508, the magnets 116 are non-round; they have an oval-shaped profile. The mechanical element 112 is formed by elastic material or elements such as springs that force the stationary divider 106 towards the moveable divider 108 and the additional divider 502 towards the moveable divider 108. The oval shape of the magnets 116 causes the mechanical element 112 to compress as the magnets 116 rotate. This causes a restoring force back to the initial position 508.

Figure 15:
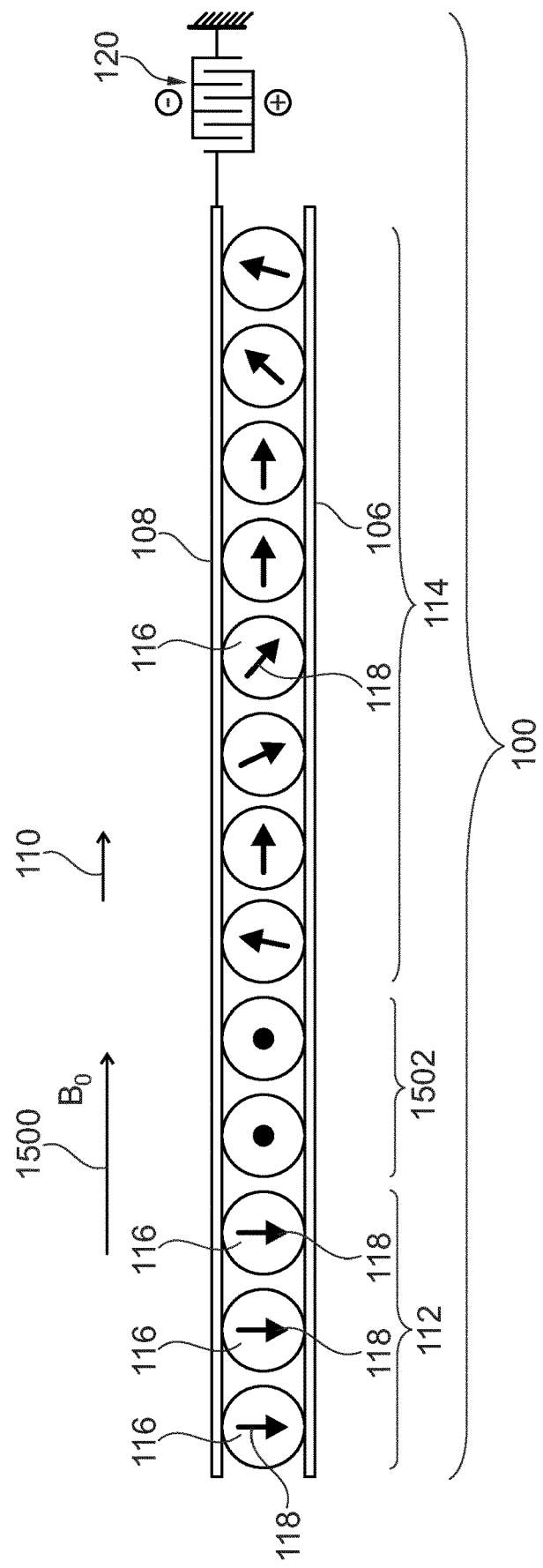
FIG. 15 illustrates a further example of a mechanical gradient magnetic field generator.

FIG. 15 illustrates an alternative method of providing a restoring force to place the moveable divider 108 back into the initial position. The arrow 1500 indicates the direction of the main magnetic field lines. To provide the restoring force a number of magnets function as the mechanical element 112. As the moveable divider 108 is moved in the displacement direction 110, the dipole moments 118 of the magnets 116 that are a part of the mechanical element 112 rotate towards the direction opposing the main magnetic field direction 1500. This causes a restoring force. There are two magnets labeled 1502 and these are magnets which are designed to not rotate. These for example may be used for shimming the magnet field or compensating for disturbances in the magnetic field caused by the magnets 116 of the mechanical element 112.

Figure 16:
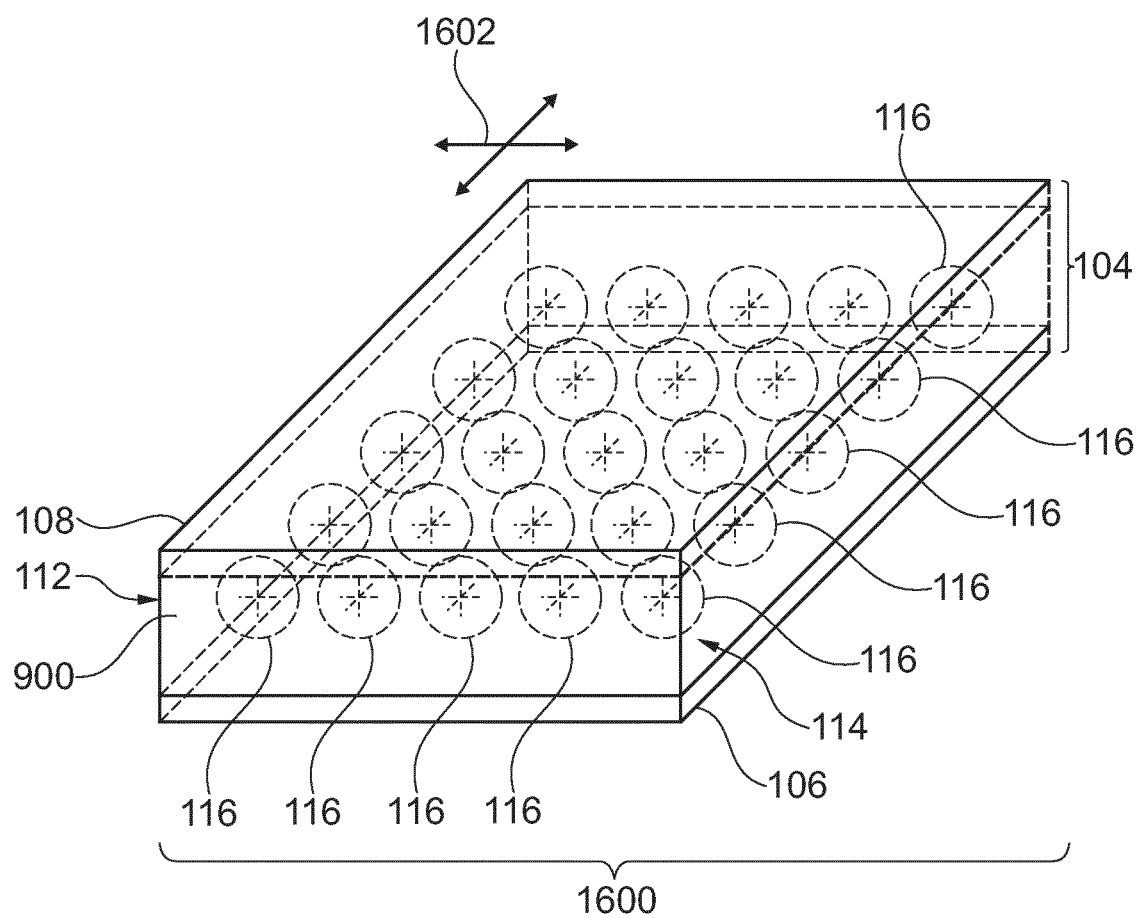
FIG. 16 illustrates a further example of a mechanical gradient magnetic field generator.

FIG. 16 illustrates a further example of a mechanical gradient magnetic field generator 1600. In this example the moveable divider 108 is able to move in two displacement directions 1602. A two-dimensional array of rotatable magnets 116 is dispersed between the moveable divider 108 and the stationary divider 106. In this example the magnets 116 are held in place by the elastic material 900. The elastic material 900 may also possibly function as the mechanical element 112. As the moveable divider 108 is moved the elastic material 900 deforms causing a rotation of the rotatable magnets 116. The orientation of the dipole moment is not illustrated in this example.

Figure 17:
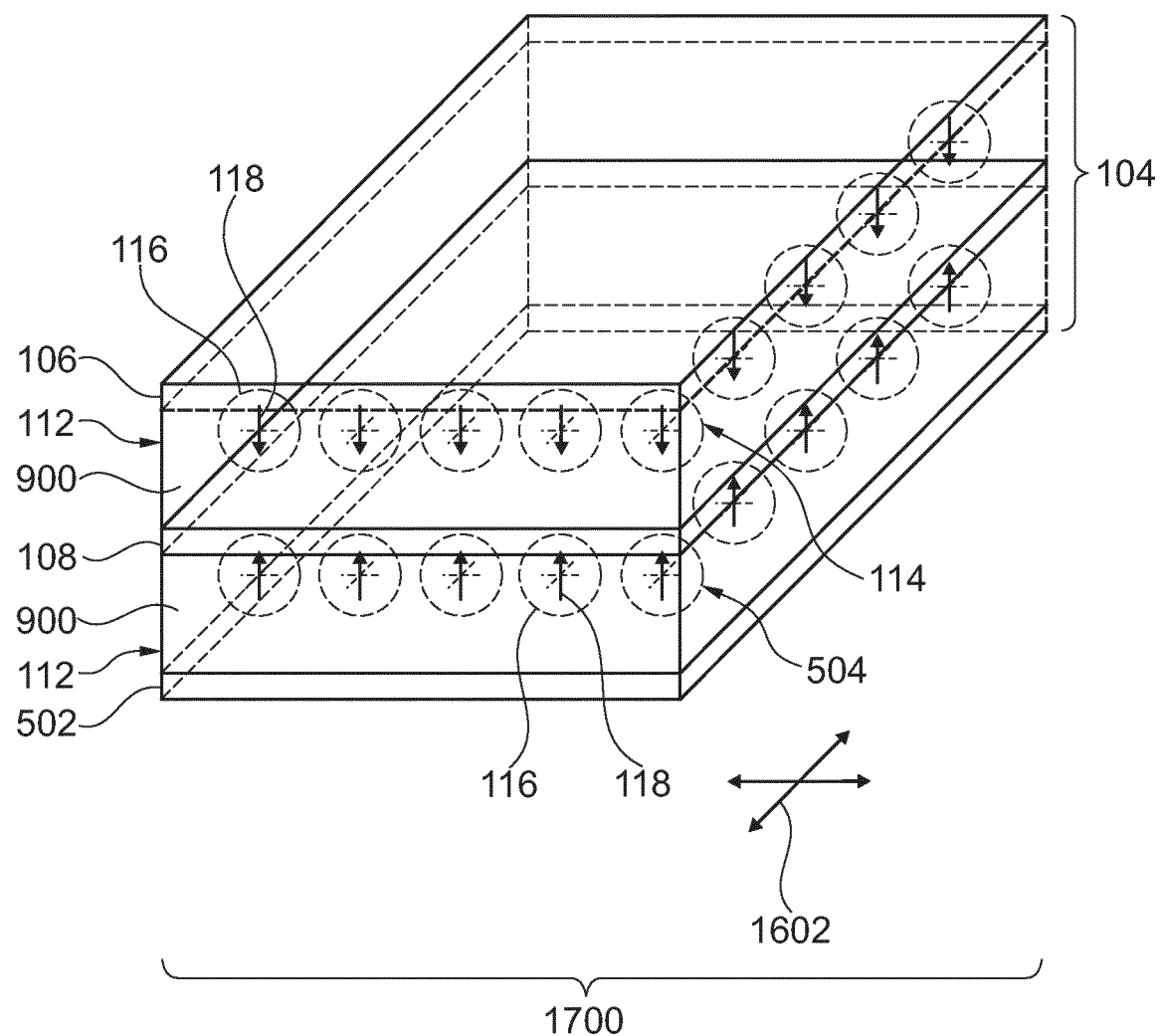
FIG. 17 illustrates a further example of a mechanical gradient magnetic field generator.

FIG. 17 illustrates a further example of a mechanical gradient magnetic field generator 1700. This example is similar to FIG. 16 except that it additionally comprises an additional layer with the additional set of magnets 504 dispersed between the moveable divider 108 and the additional divider 502. For the ease of understanding the diagram only one row and one column of the set of rotatable magnets 114 and the set of additional magnets 504 is shown. It can be seen that the dipole moments 118 in the set of rotatable magnets 114 and the set of additional magnets 504 oppose each other. If the moveable divider 108 is then moved in any direction this will cause a controllable gradient magnetic field. The set of rotatable magnets 114 and the set of additional magnets 504 are both embedded in the elastic material 900 which at least partially functions as the mechanical element 112.

Figure 18:
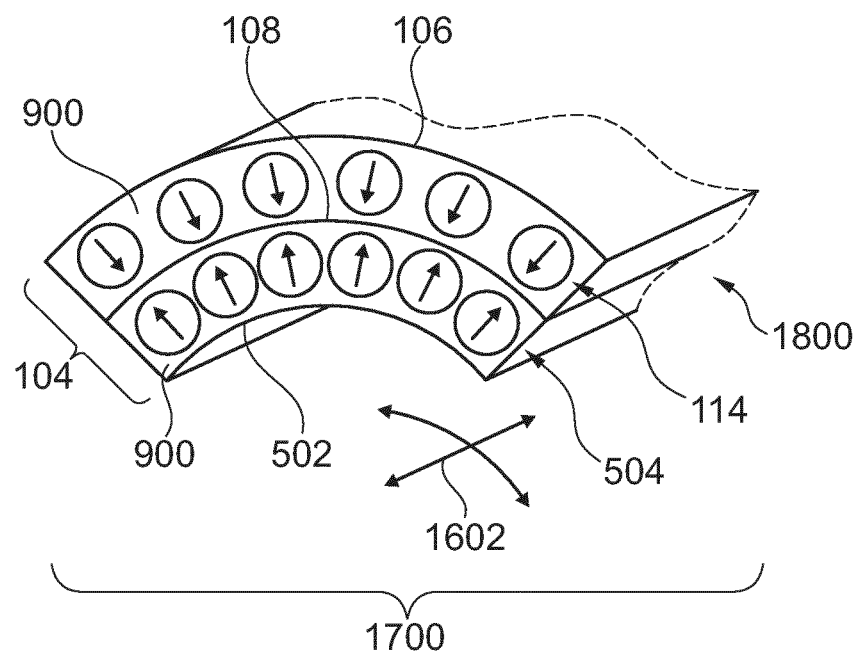
FIG. 18 illustrates a further example of a mechanical gradient magnetic field generator.

FIG. 18 shows a modification of the mechanical gradient magnetic field generator 1700 depicted in FIG. 17. In FIG. 17 the dividers 106, 108, 502 are planar. These dividers can also be formed into different shapes. In FIG. 18 a cylindrical section 1800 is shown. The dividers 106, 108, 502 can be formed into a cylinder also. They can also be formed into a spherical section. In FIG. 18 the moveable divider 108 can be moved in the two displacement directions 1602.

Figure 19:
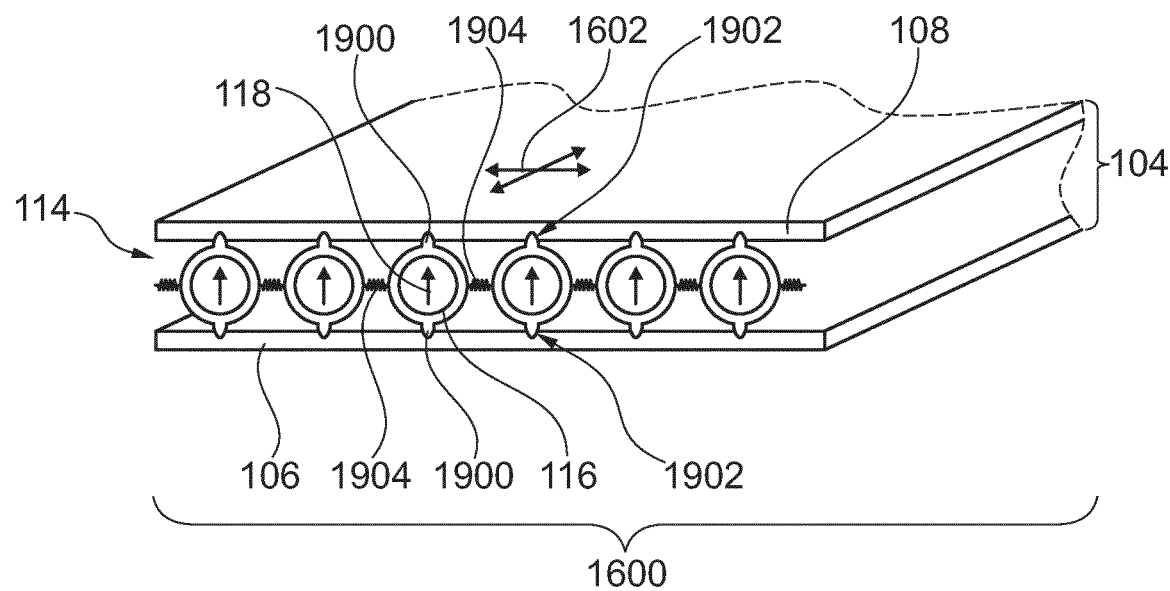
FIG. 19 illustrates a further example of a mechanical gradient magnetic field generator.

FIG. 19 illustrates a further method of manufacturing a mechanical gradient magnetic field generator 1600 that is able to be moved in two displacement directions 1602. In this example the magnets 116 have extrusions 1900 that mate with notches or holes 1902. As the moveable divider 108 is moved in any of the displacement directions 1602 the magnets will tilt and effectively have a rotation. A difficulty is that the magnets 116 may be able to spin in the main magnetic field. To prevent this there are elastic connections 1904 between each magnet 116 and its nearest neighbors. The elastic material 1900 could provide this function. In other examples there may be actual mechanical connections or springs between the nearest neighbors.

Figure 20:
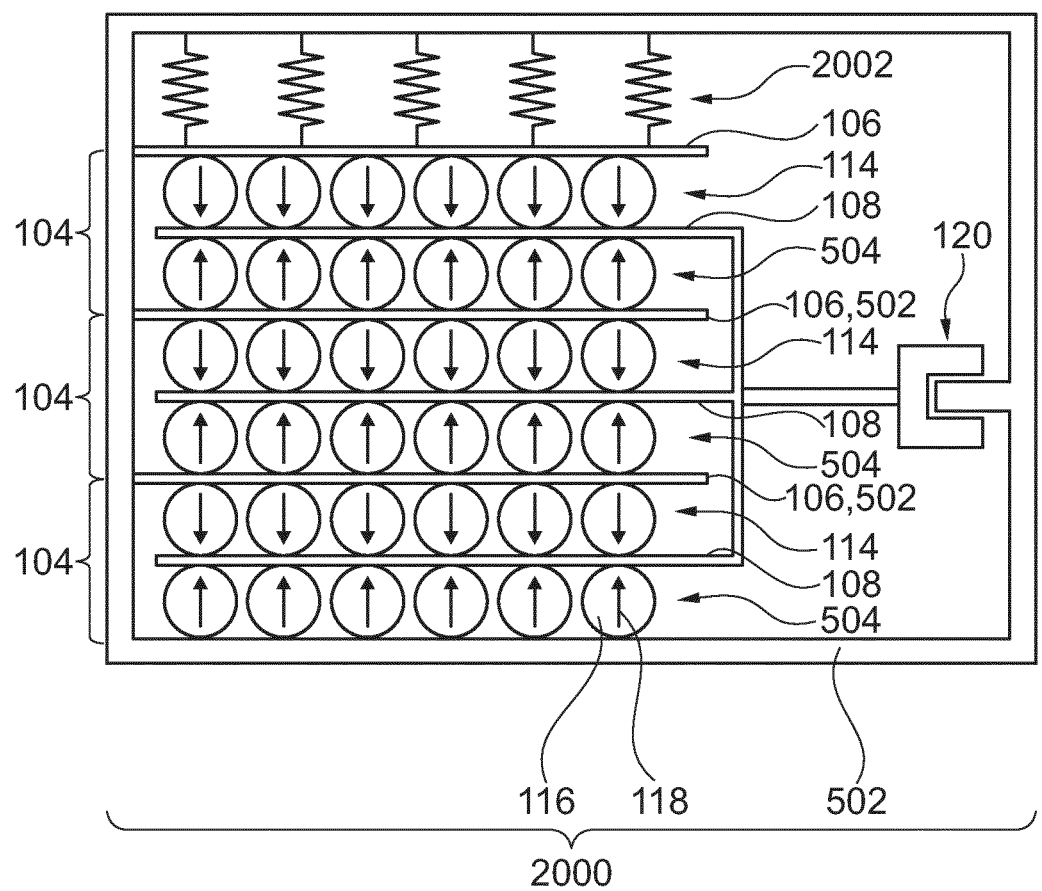
FIG. 20 illustrates a further example of a mechanical gradient magnetic field generator.

FIG. 20 illustrates a further example of a mechanical gradient magnetic field generator 2000 that comprises multiple generator layers 104. The moveable divider 108 of each layer is connected to the actuator 120. There is an additional compression element 2002 to hold all of the generator layers 104 together. In this example some of the stationary dividers 106 also function as an additional divider 502 of an adjacent layer. The mechanical element 112 which is used to provide the restoring force to the initial position is not shown in FIG. 20. The method of mechanically coupling the magnets 116 is also not shown. Any of the previously illustrated examples may be used.

Figure 21:
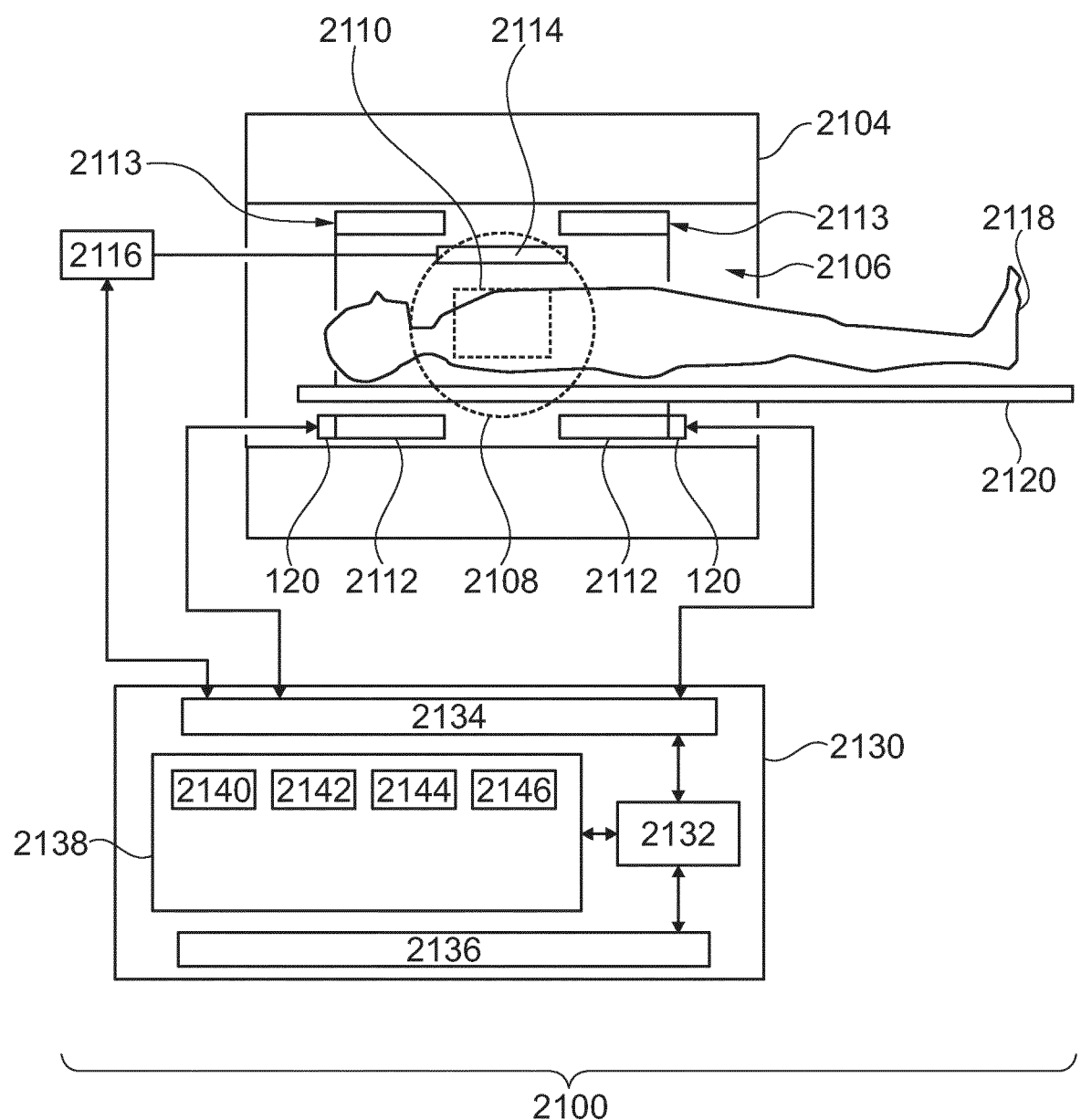
FIG. 21 illustrates an example of a magnetic resonance imaging system.

FIG. 21 illustrates an example of a magnetic resonance imaging system 2100. The magnetic resonance imaging system 2100 comprises a magnet 2104. The magnet 2104 is a superconducting cylindrical type magnet with a bore 2106 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 2106 of the cylindrical magnet 2104 there is an imaging zone 2108 where the magnetic field is strong and uniform enough to perform magnetic resonance imaging. A predetermined region of interest 2110 is shown within the imaging zone 2108. The k-space data that is typically acquired for the region of interest. A subject 2118 is shown as being supported by a subject support 2120 such that at least a portion of the subject 2118 is within the imaging zone 2108 and the predetermined region of interest 2110.

In place of conventional gradient coils and power supply the magnetic resonance imaging system 2100 incorporates a mechanical gradient magnetic field generator 2112. In this example the mechanical gradient magnetic field generator 2112 is provided in two sections. Each section is formed as e.g. a polygonal tube 2113. The mechanical gradient magnetic field generator comprises multiple of the field generating elements. The polygonal tube is formed by arranging multiple e.g. planar field generating elements. For each of the polygonal tubes 2113 the connection to the actuator 120 is shown. However, each of the field generating elements may be controlled independently. This may give a larger degree of freedom when making the gradient magnetic field.

Adjacent to the imaging zone 2108 is a radio-frequency coil 2114 for manipulating the orientations of magnetic spins within the imaging zone 2108 and for receiving radio transmissions from spins also within the imaging zone 2108. The radio frequency antenna may contain multiple coil elements. The radio frequency antenna may also be referred to as a channel or antenna. The radio-frequency coil 2114 is connected to a radio frequency transceiver 2116. The radio-frequency coil 2114 and radio frequency transceiver 2116 may be replaced by separate transmit and receive coils and a separate transmitter and receiver. It is understood that the radio-frequency coil 2114 and the radio frequency transceiver 2116 are representative. The radio-frequency coil 2114 is intended to also represent a dedicated transmit antenna and a dedicated receive antenna. Likewise, the transceiver 2116 may also represent a separate transmitter and receivers. The radio-frequency coil 2114 may also have multiple receive/transmit elements and the radio frequency transceiver 2116 may have multiple receive/transmit channels. For example, if a parallel imaging technique such as SENSE is performed, the radio-frequency could 2114 will have multiple coil elements.

The magnetic resonance imaging system 2100 is further shown as comprising a computer 2130. The computer 2130 is intended to represent one or more computing or computational devices located at one or more locations. The computer 2130 is shown as containing a computational system 2132. The computational system 2132 is intended to represent one or more computational systems that could for example be one or more processing cores located at one or more locations. Various combinations of computational systems 2132 and/or computers 2130 could be connected and work together cooperatively using a network. The computational system 2132 is shown as being in communication with a hardware interface 2134, a user interface 2136, and a memory 2138. The hardware interface 2134 is an interface which enables the computational system 2132 to communicate with and/or control other components of the magnetic resonance imaging system 2100 such as the transceiver 2116 and the mechanical gradient magnetic field generators 2112.

The user interface 2136 is a user interface that enables an operator to control and operate the magnetic resonance imaging system 100. The memory 2138 is intended to represent various types of memory which may be in communication with the computational system 2132.

The memory 2138 is shown as containing machine-executable instructions 2140. The machine-executable instructions 2140 are instructions which enable the computational system 2132 to perform various processes and tasks such as image processing, numerical calculations and control of the magnetic resonance imaging system 2100. The memory 2138 is further shown as containing pulse sequence commands 2142. The pulse sequence commands as used herein are commands or data which may be converted into commands which enable the computational system 2132 to control the magnetic resonance imaging system 2100 to acquire k-space data such as lines of k-space data 2144.

Figure 22:
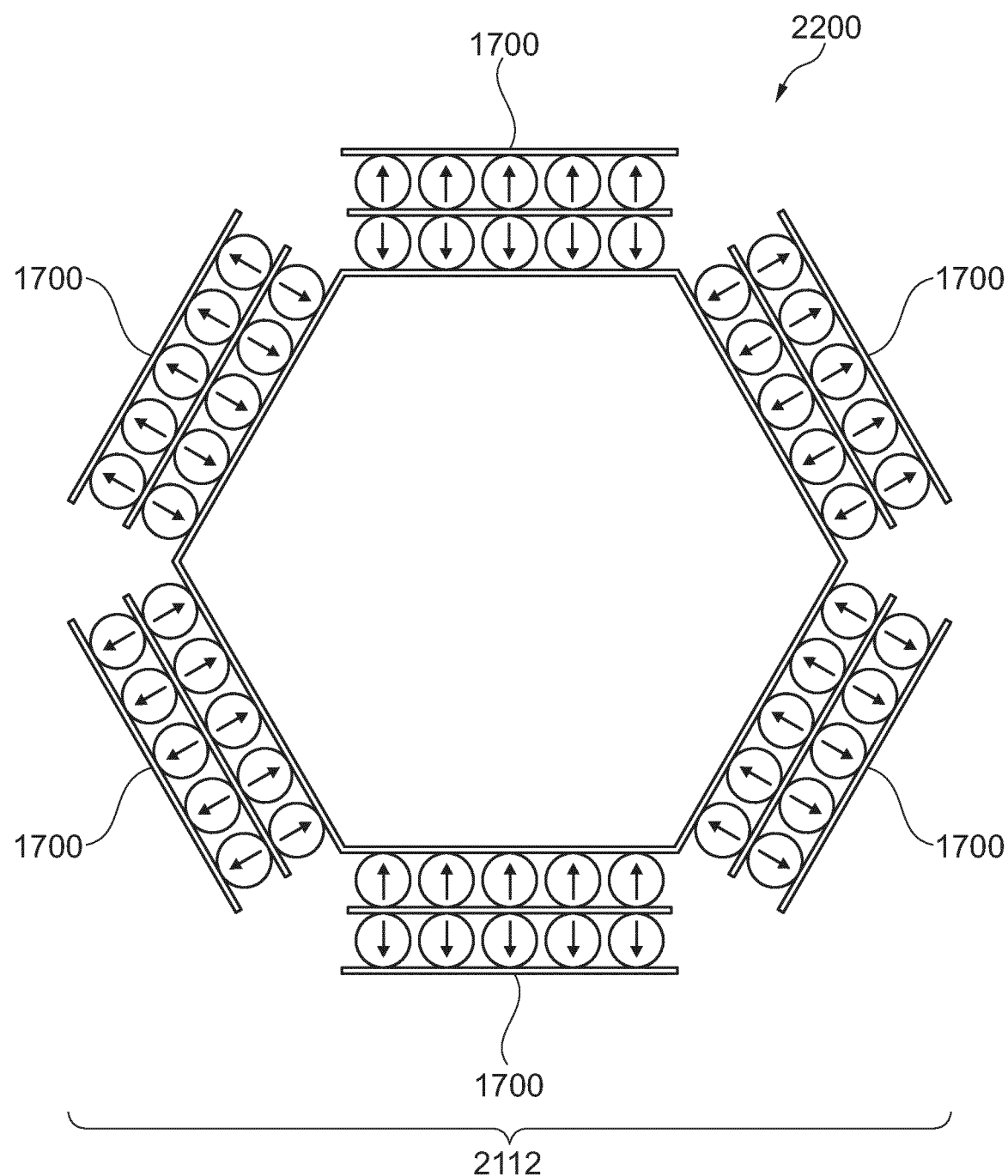
FIG. 22 illustrates a further example of a mechanical gradient magnetic field generator.

FIG. 22 shows an exemplary end view of one of the mechanical gradient magnetic field generators 2112. The mechanical gradient magnetic field generator 2112 is formed from multiple of the layers 104 as depicted in FIG. 17. FIG. 17 depicts a single planar mechanical gradient magnetic field generator 1700. The mechanical gradient magnetic field generator 2112 is formed by using multiple of the mechanical gradient magnetic field generators 1700 as depicted in FIG. 17. For example, by shifting all dividers along the z-direction (perpendicular to the plane of the drawing) generates a gradient magnetic field component along the z-directions. Shifting dividers relative to each other at different locations along the x-directions and y-direction, respectively generates gradient components along the x-direction and y direction respectively. Various other combinations of different shifts of the respective dividers give rise to gradient magnetic field in other directions.

Figure 23:
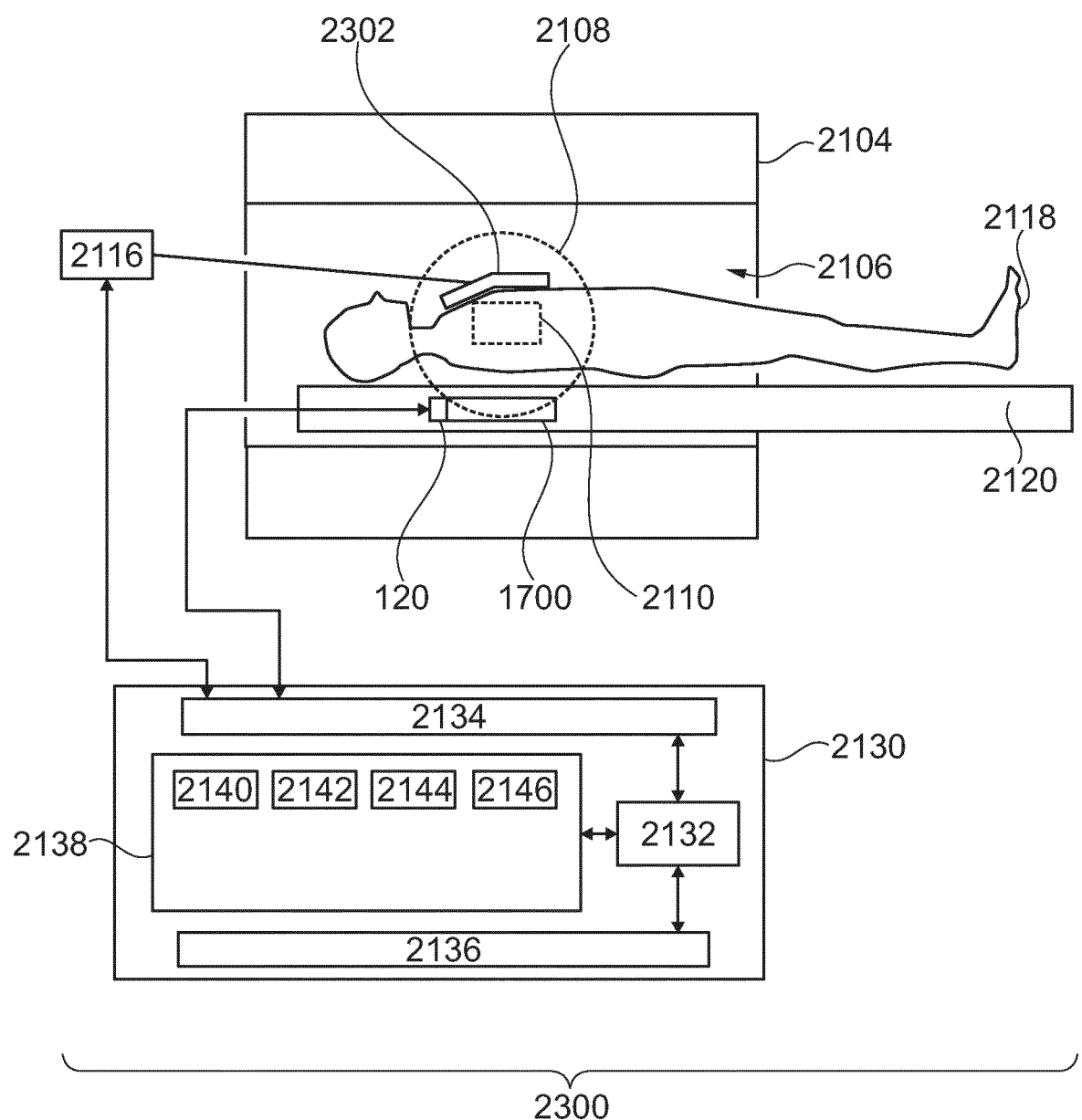
FIG. 23 illustrates a further example of a magnetic resonance imaging system.

FIG. 23 illustrates a further example of a magnetic resonance imaging system 2300. The example illustrated in FIG. 23 is similar to that as illustrated in FIG. 21. However, in this example there is a mechanical gradient magnetic field generator 1700 located within the subject support 2120. In this example the radio frequency coil is a surface coil 2302 shown as being placed on a surface of a subject 2118. A planar mechanical gradient magnetic field generator 1700 may be convenient and use very little space. The example shown in FIG. 2300 may provide for a magnetic resonance imaging system with a larger available bore size 2106. This for example may enable the construction of less expensive magnetic resonance imaging systems because a smaller magnet may provide for a larger bore 2106 size. Another advantage of both the examples in FIGS. 21 and 23 is that the expensive power supply for the magnetic field gradient coils has been eliminated.

Figure 24:
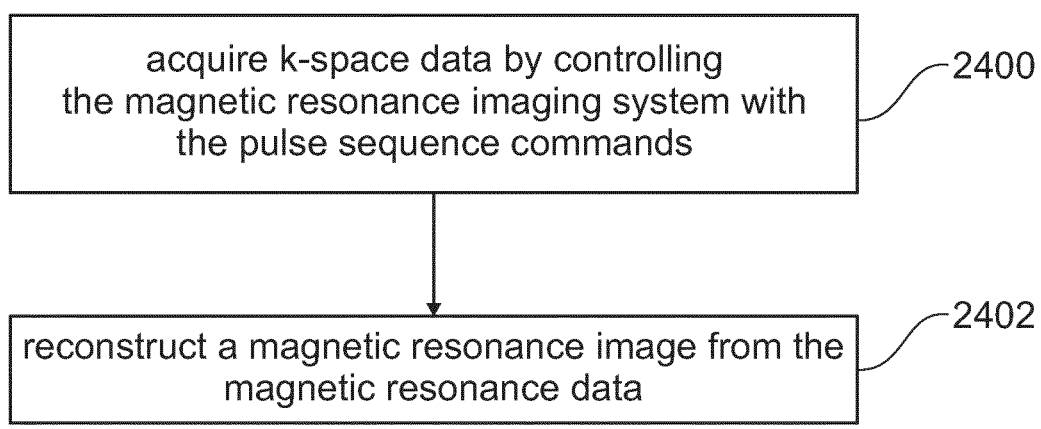
FIG. 24 shows a flow chart which illustrates a method of using the magnetic resonance imaging system of FIG. 21 or 23.

FIG. 24 shows a flowchart which illustrates a method of using the magnetic resonance imaging system 2100 of FIG. 21 or the magnetic resonance imaging system 2300 of FIG. 23. First, in step 2400, the magnetic resonance imaging system is controlled with the pulse sequence commands 2142 to cause it to acquire the k-space data 2114. The k-space data 2114 comprises commands which are used to control the mechanical gradient magnetic field generator 2112 or the mechanical gradient magnetic field generator 1700 to generate a gradient magnetic field during the acquisition of the k-space data 2114. Then, in step 2402, the k-space data 2144 is optionally reconstructed into a magnetic resonance image 2146.

Figure 25:
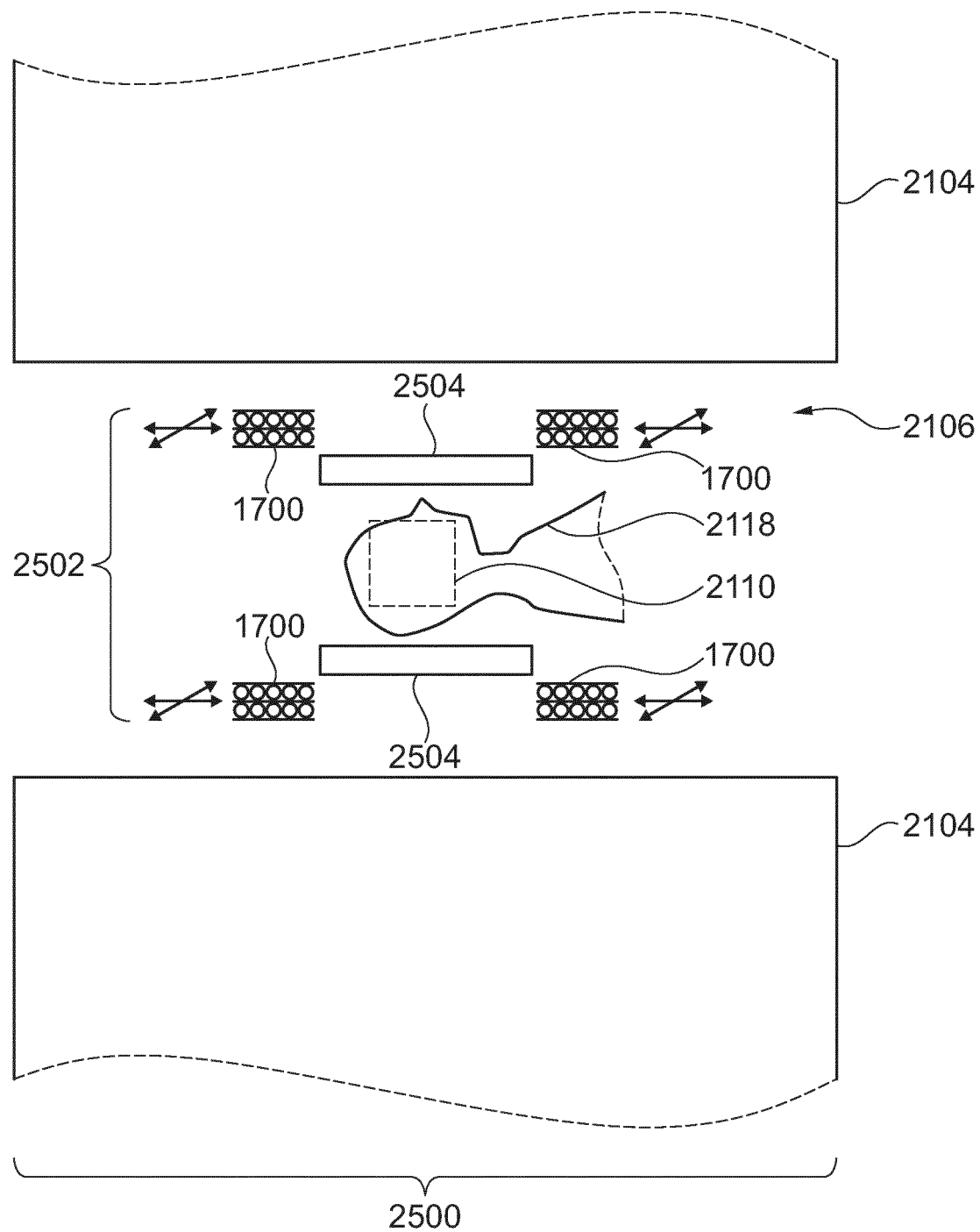
FIG. 25 illustrates an example of a head coil incorporating a mechanical gradient magnetic field generator.

FIG. 25 shows an example of a magnetic resonance imaging system 2500 with a head coil 2502 in it. The head coil comprises a radio frequency coil 2504 which may for example be a birdcage coil and integrates several mechanical gradient magnetic field generators 1700. In this example four units are used. However, other shapes like a polygonal tube 2113, as was previously depicted, may also be used. Each of the mechanical gradient magnetic field generators 1700 may be operated independently.

Figure 26:
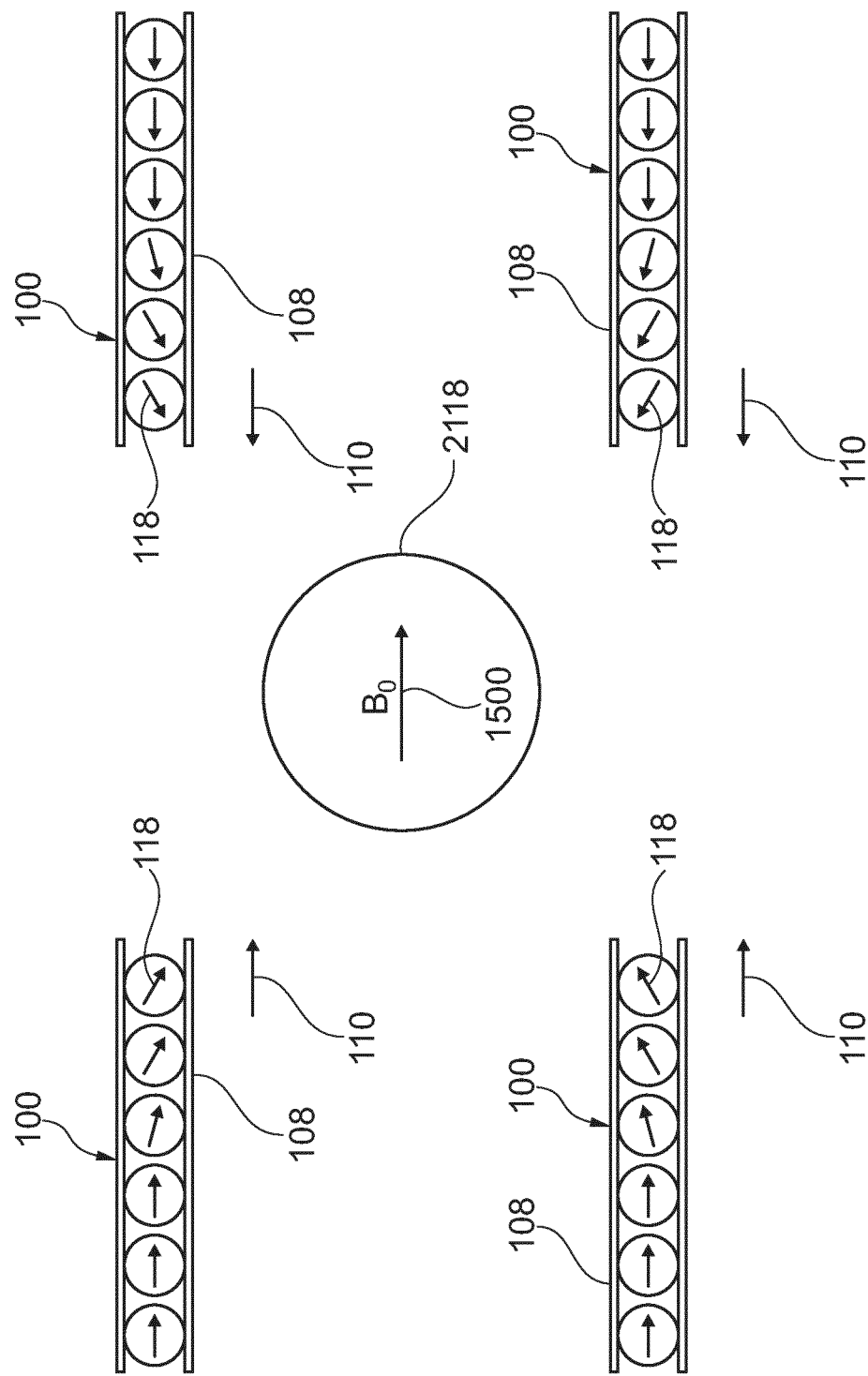
FIG. 26 illustrates a further example of a mechanical gradient magnetic field generator.

FIG. 26 illustrates the use of a mechanical gradient magnetic field generator 100 that has a single row or set of rotatable magnets 114 to produce a magnetic field gradient for measuring a subject 2118. The dipole moments do not have an appreciable effect (e.g. less than 5 ppm distortion) on the main magnetic field 1500 when they are not aligned with it. As depicted in FIG. 26 the gradient field is turned off. If the moveable divider 108 for each mechanical gradient magnetic field generator 100 is moved in the direction 110 indicated for that particular mechanical gradient magnetic field generator 100, then the gradient magnetic field for the subject 2118 will be generated.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE SIGNS LIST

100 mechanical gradient magnetic field generator
102 field generating element
104 generator layer
106 stationary divider
108 movable divider
110 displacement direction
112 mechanical element (spring)
114 set of rotatable magnets
116 rotatable magnet
118 direction of magnetic dipole
120 piezoelectric actuator
200 mechanical actuator
202 cable
300 thermomechanical actuator
400 electromechanical actuator
500 mechanical gradient magnetic field generator
502 additional divider
504 additional set of magnets
506 locking mechanism
508 initial position
800 frictional layer
900 elastic layer
1000 gear teeth
1002 gear teeth on surface
1100 ridge
1102 notch
1200 open space
1500 main magnetic field direction
1502 optional non-rotatable magnets
1600 mechanical gradient magnetic field generator
1602 two displacement directions
1700 mechanical gradient magnetic field generator
1800 cylindrical section
1900 extrusion
1902 notches
1904 elastic connection
1602 two displacement directions
2000 mechanical gradient magnetic field generator
2002 compression element
2100 magnetic resonance imaging system
2104 magnet
2106 bore of magnet
2108 imaging zone
2110 region of interest
2112 mechanical gradient magnet field generator
2113 polygonal tube
2114 radio-frequency coil
2116 transceiver
2118 subject
2120 subject support
2130 computer
2132 computational system
2134 hardware interface
2136 user interface
2138 memory
2140 machine executable instructions
2142 pulse sequence commands
2144 k-space data
2146 magnetic resonance image
2200 end view of polygonal tube
2300 magnetic resonance imaging system 2400 acquire k-space data by controlling the magnetic resonance imaging system with the pulse sequence commands 2402 reconstruct a magnetic resonance image from the k-space data 2500 magnetic resonance imaging system 2502 head coil 2504 radio frequency coil (birdcage coil)

The invention claimed is:

1. A mechanical gradient magnetic field generator comprising a field generating element comprising at least one generator layer, wherein each of the at least one generator layer comprises:
   a stationary divider;
   a movable divider configured for moving in one or two displacement directions relative to the stationary divider, wherein the movable divider has an initial position; and
   a mechanical element configured to mechanically assist movement of the movable divider in the one or two displacement directions by a restoring force generated by the mechanical element's resilience towards the initial position;
   a set of rotatable magnets positioned between the movable divider and the stationary divider, wherein the set of rotatable magnets are mechanically coupled to the movable divider and to the stationary divider, wherein the mechanical coupling of the set of rotatable magnets is such that movement of the movable divider in the one or two displacement directions causes an individual rotation of each magnet of the set of rotatable magnets.

2. The mechanical gradient magnetic field generator of claim 1, wherein the field generating element further comprises an elastic layer attached to stationary divider and the movable divider, wherein the set of rotatable magnets are at least partially embedded within the elastic layer, wherein the elastic layer provides for the mechanical coupling of the set of rotatable magnets, wherein deformation of the elastic material by the movement of the movable divider causes the individual rotation of each of the set of rotatable of magnets.

3. The mechanical gradient field generator of claim 1, wherein the mechanical coupling is provided via any one of the following:
   gear teeth on the set of rotatable magnets;
   a high friction layer on the movable divider and/or on the set of rotatable magnets and;
   a viscous layer on the movable divider and/or on the set of rotatable magnets;
   an elastic layer on the movable divider and/or on the set of rotatable magnets;
   contact between the set of rotatable magnets and the movable divider; and
   combinations thereof.

4. The mechanical gradient magnetic field generator of claim 1, wherein the mechanical gradient magnetic field generator has any one of the following shapes:
   a planar shape;
   a cylindrical shape; and
   a polygonal tube, wherein the mechanical gradient magnetic field generator comprises a plurality of the field generating element, wherein the polygonal tube is formed from the plurality of the field generating element.

5. The mechanical gradient magnetic field generator of claim 1, wherein the one or two displacement directions is two displacement directions, wherein the at least one generator layer has any one of the following shapes: a planar shape, a spherical section shape, and a cylindrical section shape.

6. The mechanical gradient magnetic field generator of claim 1, wherein each of the at least one generator layer further comprises:
   an additional divider, wherein the additional divider is stationary relative to the stationary divider, wherein the movable divider is between the additional divider and the stational divider; and
   an additional set of magnets positioned between the movable divider and the additional divider, wherein the additional set of magnets are mechanically coupled to the movable divider and to the additional divider, wherein the mechanical coupling of the additional set of magnets is such that movement of the movable divider in the one or two displacement directions causes an individual rotation of each of the additional set of magnets.

7. The mechanical gradient magnetic field generator of claim 6, wherein each of the set of rotatable magnets and the additional set of magnets has a dipole moment, wherein in the initial position a vector sum of the dipole moments of the set rotatable of magnets and the additional set of magnets is less than 10% of a magnitude sum of the dipole moments of the set of rotatable magnets and the additional set of magnets.

8. The mechanical gradient magnetic field generator of claim 7, wherein in the initial position the vector sum is less than 1% of the magnitude sum.

9. The mechanical gradient magnetic field generator of claim 1, wherein the mechanical gradient magnetic field generator further comprises a locking mechanism configured to hold the field generating element in the initial position.

10. The mechanical gradient magnetic field generator of claim 1, wherein the mechanical gradient magnetic field generator further comprises an actuator configured to simultaneously move the movable divider of each of the at least one generator layer in the one or two displacement directions.

11. The mechanical gradient magnetic field generator of claim 10, wherein the actuator is any one of the following: a mechanical actuator, a piezoelectric actuator, an electromagnetic actuator, a thermoelectric actuator, and a magnetic field coil system.

12. A magnetic resonance imaging system configured to acquire k-space data from a subject at least partially within an imaging zone, wherein the magnetic resonance imaging system comprises:
   a mechanical gradient magnetic field generator according to claim 9, wherein the mechanical gradient magnetic field generator is configured to generate the gradient magnetic field at least partially within the imaging zone;
   a memory configured to store machine executable instructions and pulse sequence commands;
   a computational system configured to control the magnetic resonance imaging system, wherein execution of the machine executable instructions causes the computational system to acquire the k-space data by controlling the magnetic resonance imaging system with the pulse sequence commands, and wherein the pulse sequence commands are configured to generate the gradient magnetic field by controlling the actuator.

13. The magnetic resonance imaging system of claim 12, wherein the magnetic resonance imaging system further comprises a magnet configured to generate a main magnetic field, wherein the mechanical gradient magnetic field generator is configured such that generation of the gradient magnetic field requires less energy than by a gradient magnetic field coil system.

14. The magnetic resonance imaging system of claim 12, wherein the mechanical element is configured to balance forces on the movable divider by the set of rotatable magnets within a predetermined force threshold when the mechanical gradient magnetic field generator is within the main magnetic field.

15. A magnetic resonance imaging coil comprising the mechanical gradient magnetic field generator according to claim 1.

16. The magnetic resonance imaging coil of 14, wherein the magnetic resonance imaging coil is a head coil or a body coil.

* * * * *